US012759079B2

(12) United States Patent
Morita et al.

(10) Patent No.: US 12,759,079 B2
(45) Date of Patent: Oct. 13, 2026

(54) ADDITIVE MANUFACTURING APPARATUS, ADDITIVE MANUFACTURING METHOD, AND MACHINE LEARNING DEVICE

(71) Applicant: Mitsubishi Electric Corporation, Tokyo (JP)

(72) Inventors: Daiji Morita, Tokyo (JP); Nobuhiro Shinohara, Tokyo (JP); Yoshikazu Ukai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 965 days.

(21) Appl. No.: 17/914,766

(22) PCT Filed: Apr. 23, 2020

(86) PCT No.: PCT/JP2020/017534

§ 371 (c)(1),
(2) Date: Sep. 27, 2022

(87) PCT Pub. No.: WO2021/214948

PCT Pub. Date: Oct. 28, 2021

(65) Prior Publication Data

US 2023/0131125 A1 Apr. 27, 2023

(51) Int. Cl.

*B23K 26/342* (2014.01)
*B23K 26/03* (2006.01)

(Continued)

(52) U.S. Cl.

CPC ............ *B23K 26/342* (2015.10); *B23K 26/03* (2013.01); *B23K 26/354* (2015.10); *B33Y 10/00* (2014.12);

(Continued)

(58) Field of Classification Search

None

See application file for complete search history.

(56) References Cited

U.S. PATENT DOCUMENTS 9,050,674 B2 6/2015 Sumner
10,058,920 B2 8/2018 Buller et al.

(Continued)

FOREIGN PATENT DOCUMENTS

CN 101885063 A 11/2010
CN 104507617 A 4/2015

(Continued)

OTHER PUBLICATIONS

Chinese Office Action issued Oct. 22, 2024, in corresponding Chinese Patent Application No. 202080099939.1, 20pp.

(Continued)

*Primary Examiner* — Elizabeth M Kerr
(74) *Attorney, Agent, or Firm* — XSENSUS LLP

(57) ABSTRACT

An additive manufacturing apparatus manufactures a shaped object by stacking layers in each of which unit beads that are solidified products of a molten material are laid side by side. The additive manufacturing apparatus includes a material supply unit that supplies a wire as the material to a workpiece, an irradiation unit that emits a laser beam for melting the material supplied, and a controller device that controls the material supply unit and the irradiation unit to form the unit beads. In the formation of unit beads brought into contact with each other to form the layer, the controller device performs control such that a formed unit bead is flattened by irradiation with the beam, and a unit bead is formed in contact with the unit bead that has been flattened.

10 Claims, 14 Drawing Sheets

(51) Int. Cl.

| | |
|---|---|
| ***B23K 26/354*** | (2014.01) |
| ***B33Y 10/00*** | (2015.01) |
| ***B33Y 30/00*** | (2015.01) |
| ***B33Y 50/02*** | (2015.01) |
| ***G05B 13/02*** | (2006.01) |

(52) U.S. Cl.
CPC ............... *B33Y 30/00* (2014.12); *B33Y 50/02* (2014.12); *G05B 13/0265* (2013.01)

(56) References Cited

U.S. PATENT DOCUMENTS

| | | | | |
|---|---|---|---|---|
| 10,796,226 | B2 | 10/2020 | Hatada | |
| 11,325,190 | B2 | 5/2022 | Morita et al. | |
| 2003/0116542 | A1* | 6/2003 | McGregor ......... | B23K 26/0608 219/121.64 |
| 2004/0099644 | A1* | 5/2004 | Allen ....................... | C21D 9/50 219/121.64 |
| 2014/0034615 | A1* | 2/2014 | Sumner .............. | B23K 26/0604 219/76.14 |
| 2015/0045928 | A1 | 2/2015 | Perez et al. | |
| 2018/0260712 | A1 | 9/2018 | Hatada | |
| 2020/0115595 | A1 | 4/2020 | Tsuchida et al. | |
| 2020/0361149 | A1 | 11/2020 | Arao et al. | |
| 2021/0323092 | A1 | 10/2021 | Morita et al. | |

FOREIGN PATENT DOCUMENTS

| | | | |
|---|---|---|---|
| CN | 108568596 | A | 9/2018 |
| JP | 2016-533925 | A | 11/2016 |
| JP | 2018058086 | A | 4/2018 |
| JP | 2019-507236 | A | 3/2019 |
| JP | 2019-63858 | A | 4/2019 |
| JP | 2019-73766 | A | 5/2019 |
| JP | 2019-84814 | A | 6/2019 |
| JP | 6552771 | B1 | 7/2019 |
| JP | 6795086 | B2 | 12/2020 |
| JP | 6877576 | B2 | 5/2021 |
| WO | 2014020427 | A3 | 3/2014 |
| WO | 2015/020939 | A1 | 2/2015 |

OTHER PUBLICATIONS

Huang et al., “Quality characterization and technological design in laser hot wire cladding”, Materials Heat Journal of Processing, Sep. 2016, 5 pp., with English abstract.

German Office Action with an English translation (German Application No. 11 2020 007 111.1 Date Mailed: Jul. 19, 2025), 21pp.

Chinese Decision of Rejection with a full English machine translation issued in corresponding CN Application No. 202080099939.1, on Feb. 18, 2025, 15pp.

International Search Report and Written Opinion mailed on Jun. 30, 2020, received for PCT Application PCT/JP2020/017534, filed on Apr. 23, 2020, 12 pages including English Translation.

* cited by examiner

ADDITIVE MANUFACTURING APPARATUS, ADDITIVE MANUFACTURING METHOD, AND MACHINE LEARNING DEVICE

CROSS-REFERENCE TO RELATED APPLICATION

The present application is based on PCT filing PCT/JP2020/017534, filed Apr. 23, 2020, the entire contents of which are incorporated herein by reference.

FIELD

The present disclosure relates to an additive manufacturing apparatus that manufactures a three-dimensional shaped object, an additive manufacturing method, and a machine learning device.

BACKGROUND

A technique for additive manufacturing (AM) has been known as one technique for manufacturing a three-dimensional shaped object. Among a number of methods used in the additive manufacturing technique, a direct energy deposition (DED) method has an advantage over the other methods in that a shaped object is manufactured in less time and material used therein can be easily switched. The DED method has an advantage of having fewer restrictions on a base material as a workpiece than the other methods. In the case of the DED method, the amount of material consumed is limited to the amount used for manufacturing the shaped object, and thus less material is wasted than in the other methods. An additive manufacturing apparatus adopting the DED method can use both powder and wire as the material by changing the configuration of a processing head as appropriate. In the case of using the wire as the material, an existing welding wire can be used so that the material can be procured at a reduced cost and with ease.

Patent Literature 1 discloses a method of manufacturing a shaped object by stacking layers on top of another, each of the layers including a plurality of beads joined to one another. In the method disclosed in Patent Literature 1, each of the beads is formed by solidifying a welding wire melted by an arc. Moreover, the method disclosed in Patent Literature 1 forms one layer, melts the surface of the layer, and then forms a next layer, so as to eliminate a gap remaining between the two layers layered on top of each other.

CITATION LIST

Patent Literature

Patent Literature 1: Japanese Patent Application Laid-open No. 2019-63858

SUMMARY

Technical Problem

According to the conventional technique disclosed in Patent Literature 1 listed above, even when the surface of the layer is melted, a gap remains between the beads adjacent to each other in the same layer. Therefore, the conventional technique has suffered a problem that the gap remaining in the shaped object leads to decrease in strength of the shaped object.

The present disclosure has been made in view of the above circumstances, and an object thereof is to provide an additive manufacturing apparatus capable of preventing a decrease in strength of a shaped object.

Solution to Problem

In order to solve the above-mentioned problem and achieve the object, the present disclosure provides an additive manufacturing apparatus that manufactures a shaped object by stacking layers in each of which unit beads that are solidified products of a molten material are laid side by side, the additive manufacturing apparatus comprising: a material supply unit to supply the material to a workpiece; an irradiation unit to emit a beam that melts the material supplied; and a controller device to control the material supply unit and the irradiation unit to form the unit bead, wherein in forming unit beads that are brought into contact with each other to form the layer, the controller device performs control such that a formed unit bead is flattened by irradiation with the beam, and a unit bead is formed in contact with the formed unit bead that has been flattened.

Advantageous Effects of Invention

The additive manufacturing apparatus according to the present disclosure has an advantageous effect that it can prevent a decrease in strength of a shaped object.

DESCRIPTION OF EMBODIMENTS

Hereinafter, an additive manufacturing apparatus, an additive manufacturing method, and a machine learning device according to embodiments will be described in detail with reference to the drawings.

First Embodiment

Figure 1:
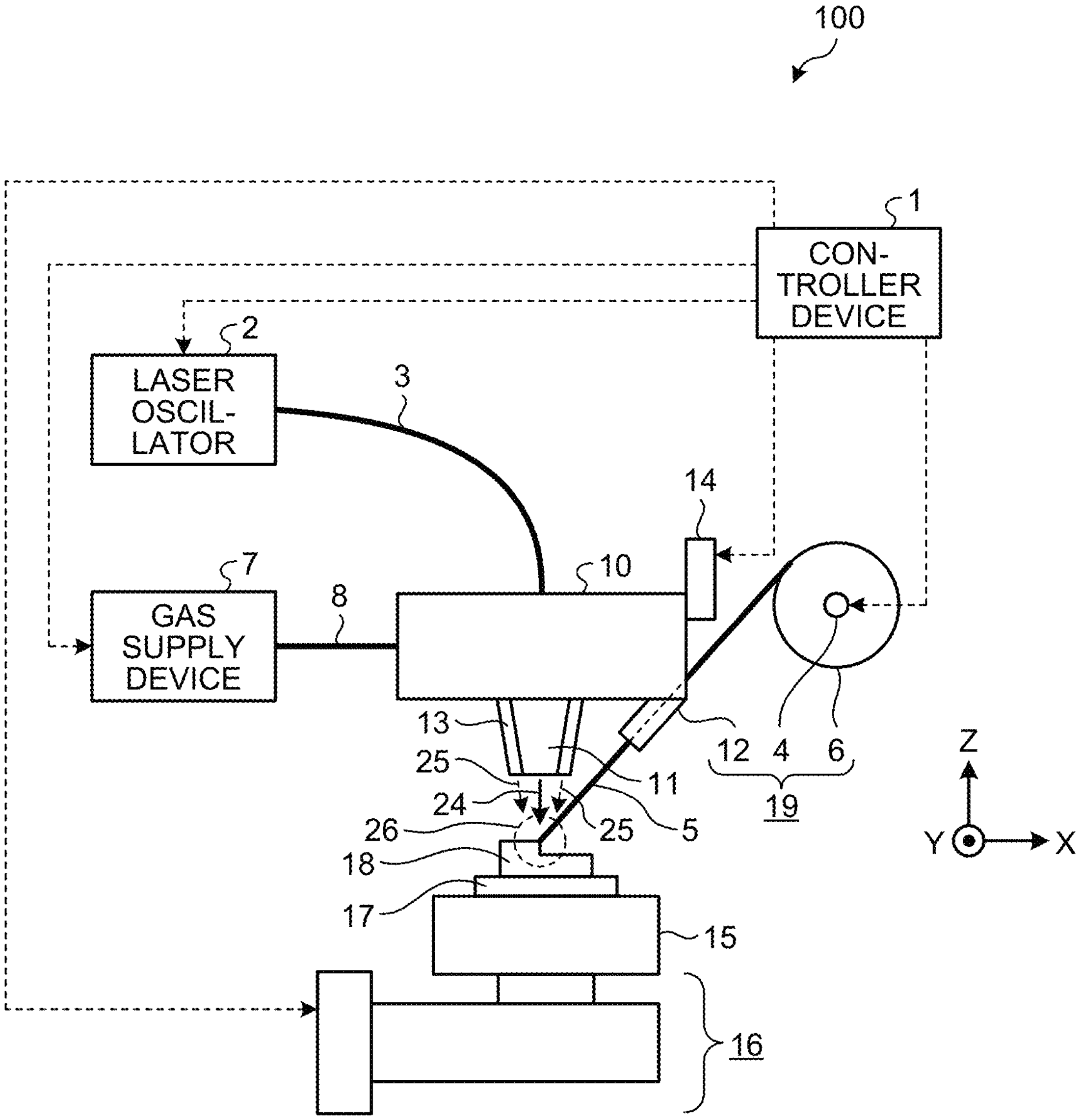
FIG. 1 is a diagram illustrating an additive manufacturing apparatus according to a first embodiment.
Figure 2:
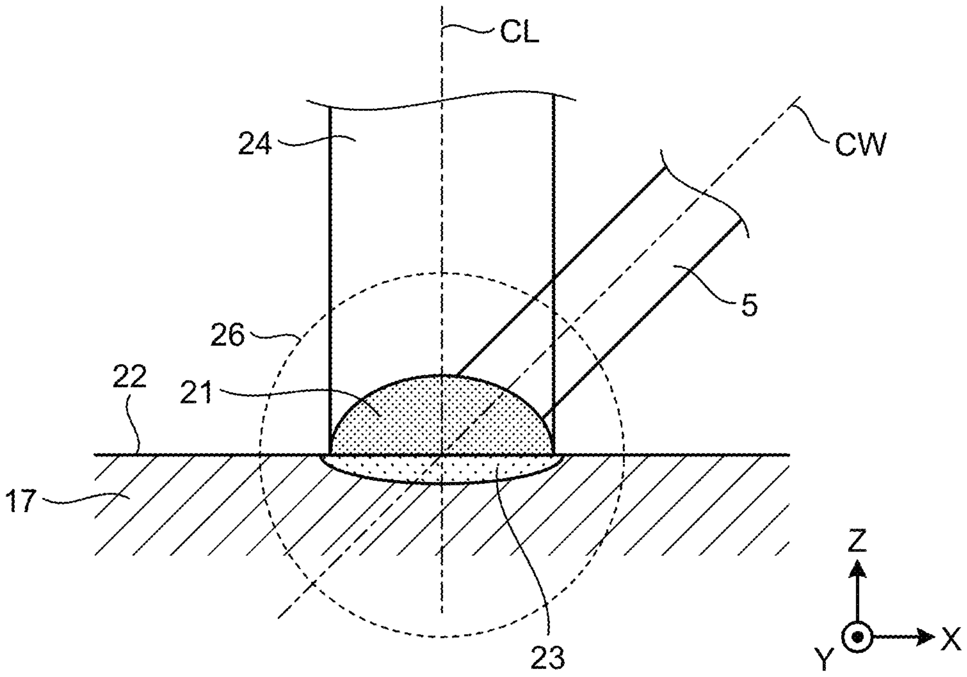
FIG. 2 is a schematic diagram illustrating a situation in machining performed by the additive manufacturing apparatus according to the first embodiment.

FIG. 1 is a diagram illustrating an additive manufacturing apparatus according to a first embodiment. FIG. 2 is a schematic diagram illustrating a situation in machining performed by the additive manufacturing apparatus according to the first embodiment. An additive manufacturing apparatus 100 is a machine tool configured to manufacture a shaped object by adding a molten material to a workpiece. In the first embodiment, a beam is a laser beam 24, and the material is a wire 5 made of metal. The wire 5 may be made of some material other than metal. The material used by the additive manufacturing apparatus 100 is not necessarily limited to the wire 5, and may be metal or resin powder.

The additive manufacturing apparatus 100 forms a deposited material 18 by stacking layers on top of another with the layer having unit beads that are solidified products of a molten material, the unit beads being laid side by side in the layer, thereby to manufacture the shaped object. The shaped object refers to the deposited material 18 obtained after the material has been added according to a machining program. The additive manufacturing apparatus 100 forms the deposited material 18 on a base material 17. The base material 17 is placed on a stage 15. The base material 17 illustrated in FIG. 1 is a plate material. The base material 17 may be some material other than the plate material. In the following description, the workpiece is an object to which the molten material is added, and refers to the base material 17 or the deposited material 18.

The additive manufacturing apparatus 100 includes a processing head 10 that moves with respect to the workpiece. The processing head 10 includes a beam nozzle 11, a wire nozzle 12, and a gas nozzle 13. The beam nozzle 11 emits the laser beam 24 toward the workpiece. The laser beam 24 is a heat source that melts the wire 5. The wire nozzle 12 causes the wire 5 to travel toward an irradiation position of the laser beam 24 on the workpiece. The gas nozzle 13 sprays an inert gas 25 that is a shielding gas toward the workpiece. By spraying the gas, the additive manufacturing apparatus 100 reduces or prevents oxidation of the deposited material 18 and cools the layer formed on the workpiece. The beam nozzle 11, the wire nozzle 12, and the gas nozzle 13 are fixed to the processing head 10, so that a positional relationship thereamong is uniquely determined. That is, relative positions of the beam nozzle 11, the gas nozzle 13, and the wire nozzle 12 are fixed.

A laser oscillator 2 that is a beam source causes the laser beam 24 to oscillate. The laser beam 24 from the laser oscillator 2 propagates to the processing head 10 through a fiber cable 3 that is an optical transmission line. The laser oscillator 2, the fiber cable 3, and the processing head 10 form an irradiation unit that adapted to irradiate the workpiece with the laser beam 24 for melting the wire 5.

The laser beam 24 emitted from the beam nozzle 11 to the workpiece may be non-coaxial or coaxial with a central axis CW of the wire 5. The laser beam 24 emitted from the beam nozzle 11 to the workpiece and the central axis CW of the wire 5 can be set coaxially by using a donut beam formed into a donut shape for the laser beam 24 or by using a plurality of split laser beams for the laser beam 24. Note that the first embodiment describes a case where the laser beam 24 emitted from the beam nozzle 11 to the workpiece is non-coaxial with the central axis CW of the wire 5.

A gas supply device 7 supplies the inert gas 25 to the gas nozzle 13 through a pipe 8. The gas supply device 7, the pipe 8, and the gas nozzle 13 constitute a gas supply unit that ejects the inert gas 25 to a processing area 26.

A wire spool 6 around which the wire 5 is wound is a supply source of the material. The wire spool 6 rotates with driving of a rotary motor 4 that is a servomotor, and this rotation causes the wire 5 to be fed out from the wire spool 6. The wire 5 fed out from the wire spool 6 passes through the wire nozzle 12 and is supplied to the irradiation position of the laser beam 24. Also, the wire 5 supplied to the irradiation position of the laser beam 24 can be pulled out from the irradiation position of the laser beam 24 by subjecting the rotary motor 4 to rotary drive in a direction opposite to that in the case of feeding out the wire 5 from the wire spool 6. In this case, a portion of the wire 5 that is being fed out from the wire spool 6 and that is near the wire spool 6 is reeled off by the wire spool 6. The rotary motor 4, the wire spool 6, and the wire nozzle 12 constitute a material supply unit 19 that supplies the material to the workpiece.

Note that the wire nozzle 12 may be provided with an operation mechanism for pulling out the wire 5 from the wire spool 6. The additive manufacturing apparatus 100 has at least one of the rotary motor 4 and the operation mechanism of the wire nozzle 12 to thereby be able to supply the wire 5 to the irradiation position of the laser beam 24. FIG. 1 omits the illustration of the operation mechanism of the wire nozzle 12.

A head drive device 14 moves the processing head 10 in each of an X-axis direction, a Y-axis direction, and a Z-axis direction. An X-axis, a Y-axis, and a Z-axis are three axes perpendicular to one another. The X-axis and the Y-axis are axes parallel to a horizontal direction. The Z-axis direction is a vertical direction. The head drive device 14 includes a servomotor constituting an operation mechanism for movement of the processing head 10 in the X-axis direction, a servomotor constituting an operation mechanism for movement of the processing head 10 in the Y-axis direction, and a servomotor constituting an operation mechanism for movement of the processing head 10 in the Z-axis direction. The head drive device 14 is an operation mechanism that enables translational motion in a direction of each of the three axes individually. FIG. 1 omits the illustration of the servomotors. The additive manufacturing apparatus 100 can move the irradiation position of the laser beam 24 on the workpiece by moving the processing head 10 by the head drive device 14. The additive manufacturing apparatus 100 may move the irradiation position of the laser beam 24 on the workpiece by moving the stage 15.

The processing head 10 illustrated in FIG. 1 causes the laser beam 24 to travel in the Z-axis direction from the beam nozzle 11. The wire nozzle 12 is provided at a position away from the beam nozzle 11 in an X-Y plane, and causes the wire 5 to travel in an oblique direction with respect to the Z-axis. Note that the wire nozzle 12 may be fixed in the Z-axis direction in the processing head 10 to cause the wire 5 to travel in a direction parallel to the Z-axis. The wire nozzle 12 limits the travel of the wire 5 so that the wire 5 is supplied to a desired position.

In the processing head 10 illustrated in FIG. 1, the gas nozzle 13 is provided coaxially with the beam nozzle 11 on an outer peripheral side of the beam nozzle 11 in the X-Y plane, and ejects gas along a central axis of the laser beam 24 emitted from the beam nozzle 11. That is, the beam nozzle 11 and the gas nozzle 13 are located coaxially with each other. Note that the gas nozzle 13 may eject gas in an oblique direction with respect to the Z-axis. That is, the gas nozzle 13 may eject gas in an oblique direction with respect to the central axis of the laser beam 24 emitted from the beam nozzle 11.

A rotation mechanism 16 is an operation mechanism that enables rotation of the stage 15 about a first axis and rotation of the stage 15 about a second axis perpendicular to the first axis. In the rotation mechanism 16 illustrated in FIG. 1, the first axis is an axis parallel to the X-axis, and the second axis is an axis parallel to the Y-axis. The rotation mechanism 16 includes a servomotor constituting an operation mechanism for rotating the stage 15 about the first axis, and a servomotor constituting an operation mechanism for rotating the stage 15 about the second axis. The rotation mechanism 16 is an operation mechanism that enables rotational motion about each of the two axes. FIG. 1 omits the illustration of the servomotors.

The additive manufacturing apparatus 100 can change a posture or position of the workpiece by rotating the stage 15 by the rotation mechanism 16. That is, the additive manufacturing apparatus 100 can move the irradiation position of the laser beam 24 on the workpiece by rotating the stage 15. By virtue of using the rotation mechanism 16, even a complicated shape having a tapered shape can be formed.

The controller device 1 controls the additive manufacturing apparatus 100 according to the machining program. The controller device 1 is, for example, a numerical control device. The controller device 1 controls the position of the head drive device 14 by outputting a position command to the head drive device 14. The controller device 1 controls laser oscillation of the laser oscillator 2 by outputting an output command that is a command according to a condition on beam intensity, to the laser oscillator 2.

The controller device 1 controls the rotary motor 4 by outputting a supply command that is a command according to a condition on a feed amount of the material, to the rotary motor 4. The supply command may be a command according to a condition on a feed rate of the wire 5. The feed rate is a rate at which the wire 5 travels from the wire spool 6 toward the irradiation position. The feed rate represents the feed amount of the material per unit time.

The controller device 1 controls the amount of the inert gas 25 supplied from the gas supply device 7 to the gas nozzle 13 by outputting a command according to a condition on a supplied amount of the gas to the gas supply device 7. The controller device 1 controls driving of the rotation mechanism 16 by outputting a rotation command to the rotation mechanism 16. That is, the controller device 1 controls the entirety of the additive manufacturing apparatus 100 by outputting various commands. The controller device 1 causes the additive manufacturing apparatus 100 to form the unit beads by controlling the material supply unit 19, the irradiation unit, the gas supply unit, the head drive device 14, and the rotation mechanism 16.

As illustrated in FIG. 2, the additive manufacturing apparatus 100 deposits a molten material 21 in the processing area 26 by irradiating the wire 5 supplied to the processing area 26 with the laser beam 24. In the processing area 26, a molten pool 23 is formed when the workpiece is melted on a surface 22 of the workpiece. In the processing area 26, the molten material 21 generated by the melting of the wire 5 is welded into the molten pool 23. The processing area 26 is an area of the surface 22 where additive processing is performed locally.

The additive manufacturing apparatus 100 causes the head drive device 14 and the rotation mechanism 16 to operate in conjunction with each other to move the processing head 10 and the stage 15, thereby changing the position of the processing area 26 on the surface 22. The additive manufacturing apparatus 100 can thus obtain a shaped object having a desired shape.

Next, a hardware configuration of the controller device 1 will be described. The function of the controller device 1 is implemented when a control program that is a program for executing control of the additive manufacturing apparatus 100 is executed with use of hardware.

Figure 3:
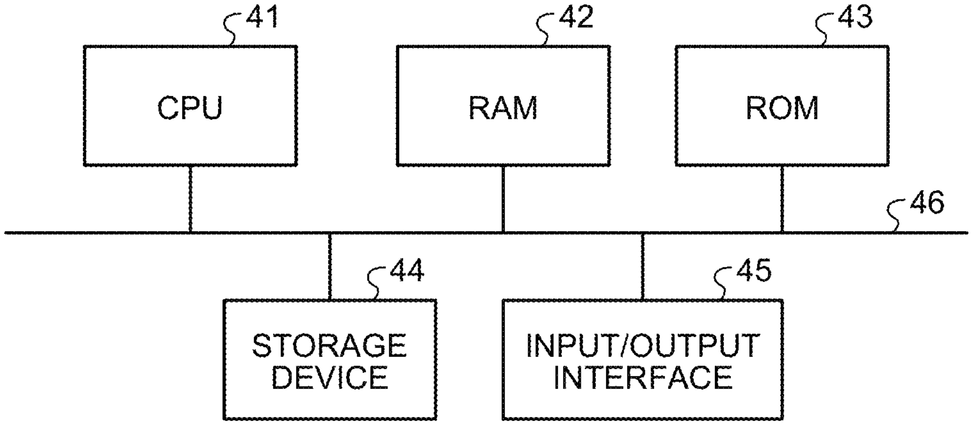
FIG. 3 is a block diagram illustrating an example of a hardware configuration of a controller device included in the additive manufacturing apparatus according to the first embodiment.

FIG. 3 is a block diagram illustrating an example of the hardware configuration of the controller device included in the additive manufacturing apparatus according to the first embodiment. The controller device 1 includes a central processing unit (CPU) 41 adapted to execute various processings, a random access memory (RAM) 42 including a data storage area, a read only memory (ROM) 43 that is a non-volatile memory, a storage device 44, and an input/output interface 45 for inputting information to the controller device 1 and outputting information from the controller device 1. The units illustrated in FIG. 3 are connected to one another via a bus 46.

The CPU 41 executes a program stored in the ROM 43 or the storage device 44. The control on the entirety of the additive manufacturing apparatus 100 performed by the controller device 1 is implemented using the CPU 41.

The storage device 44 is a hard disk drive (HDD) or a solid state drive (SSD). The storage device 44 stores the control program and various kinds of data. The ROM 43 stores software or a program for controlling hardware, which is a boot loader such as Basic Input/Output System (BIOS) or Unified Extensible Firmware Interface (UEFI) that is a program for control serving as a base of a computer or controller corresponding to the controller device 1. Note that the control program may be stored in the ROM 43.

The program stored in the ROM 43 and the storage device 44 are loaded into the RAM 42. The CPU 41 executes the various kinds of processings with expanding the control program in the RAM 42. The input/output interface 45 is a connection interface with a device outside the controller device 1. The input/output interface 45 receives the machining program as its input. The input/output interface 45 also outputs various kinds of commands. The controller device 1 may include an input device such as a keyboard or a pointing device, and an output device such as a display.

The control program may be stored in a computer-readable storage medium. The controller device 1 may store the control program stored in the storage medium, in the storage device 44. The storage medium may be a portable storage medium that is a flexible disk, or may be a flash memory that is a semiconductor memory. The control program may be installed on the computer or controller serving as the controller device 1 from another computer or server device via a communication network.

The function of the controller device 1 may be implemented by a processing circuit that is based on dedicated hardware for controlling the additive manufacturing apparatus 100. The processing circuit is a single circuit, a composite circuit, a programmed processor, a parallel-programmed processor, an application specific integrated circuit (ASIC), a field programmable gate array (FPGA), or a combination thereof. A part of the function of the controller device 1 may be implemented by dedicated hardware and the remainder thereof may be implemented by software or firmware.

Figure 4:
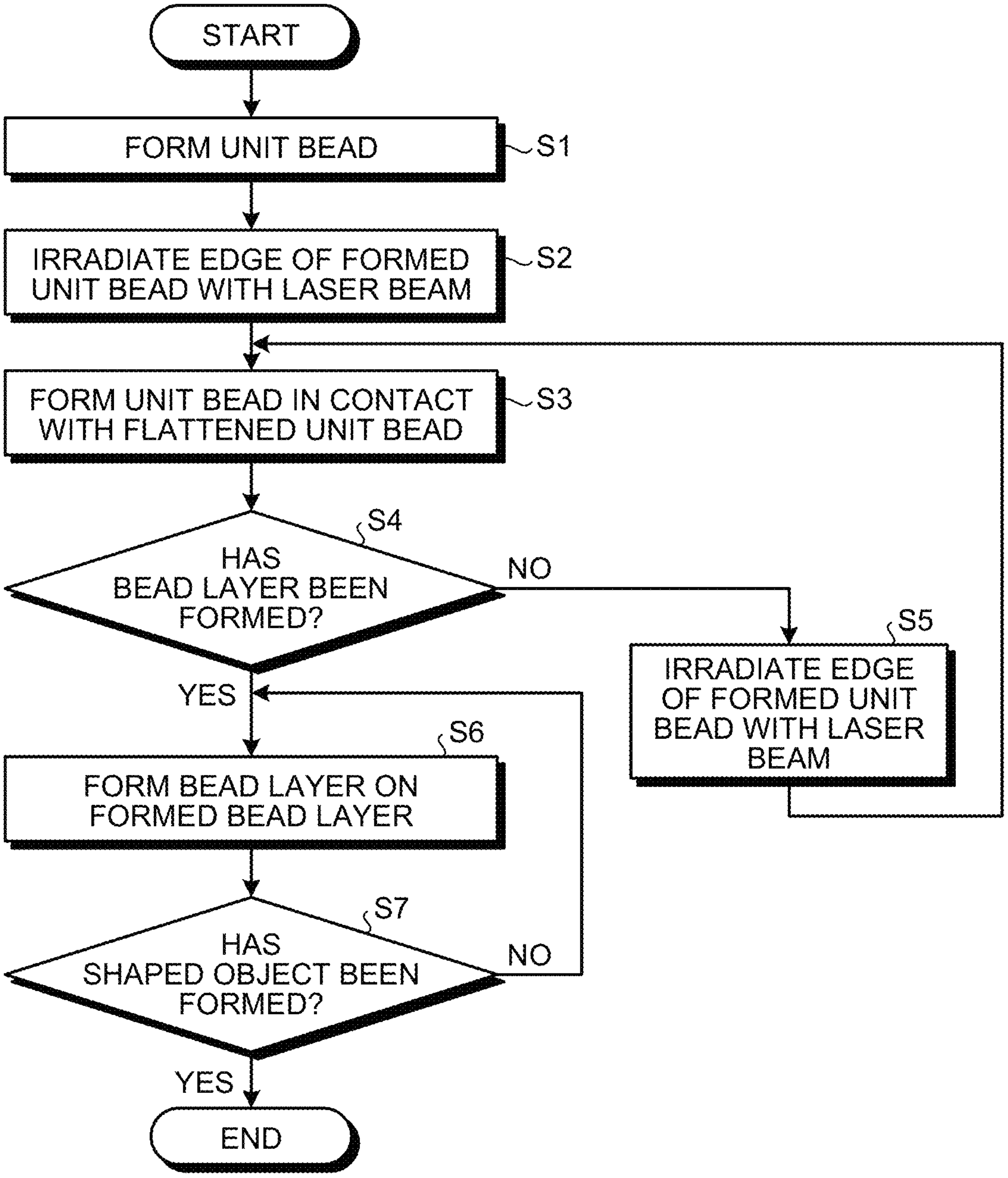
FIG. 4 is a flowchart illustrating an operation procedure of the additive manufacturing apparatus according to the first embodiment.
Figure 5:
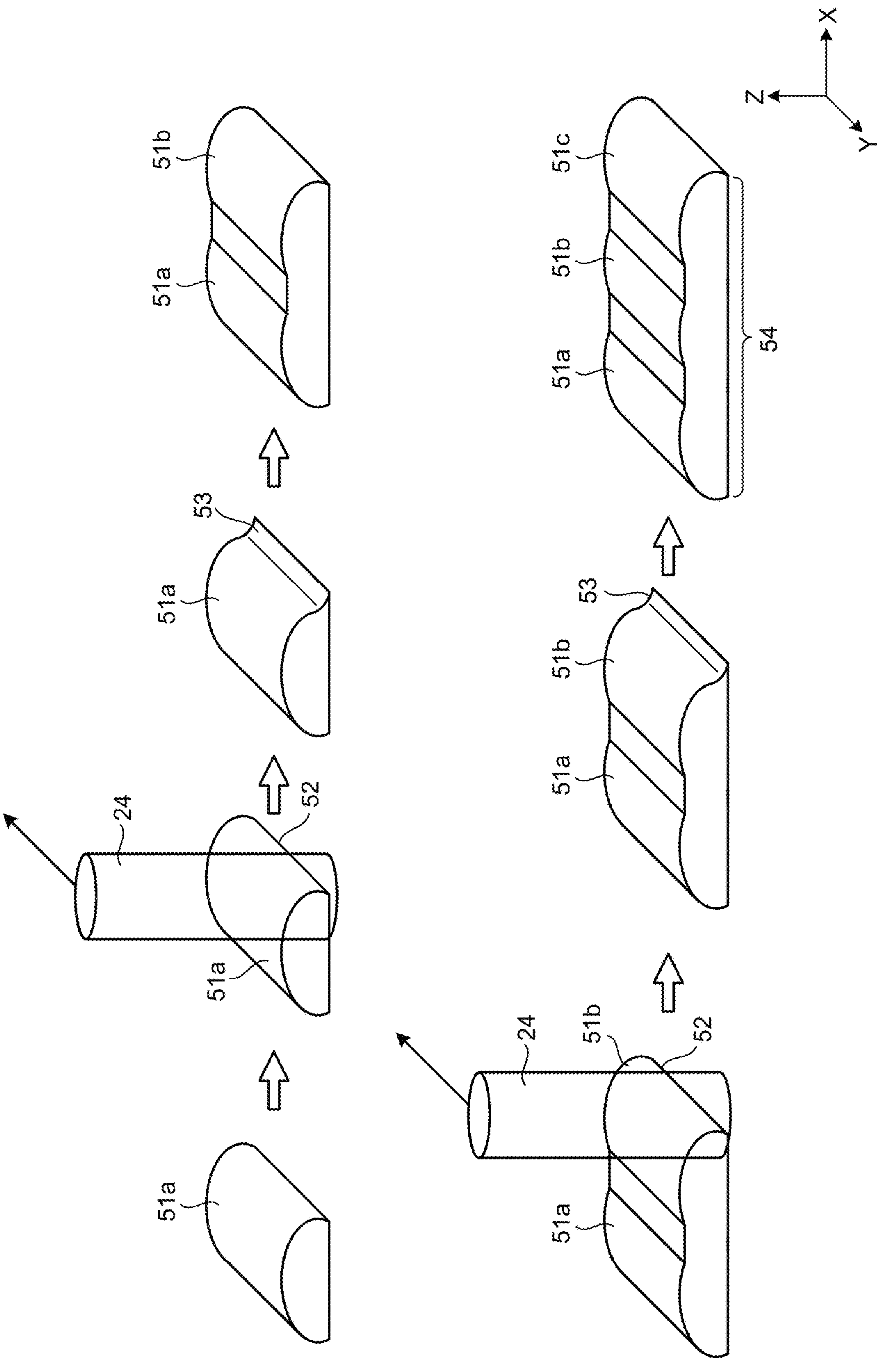
FIG. 5 is a diagram for explaining formation of a deposited material by the additive manufacturing apparatus according to the first embodiment.

Next, the operation of the additive manufacturing apparatus 100 according to the first embodiment will be described with reference to FIGS. 4 and 5. FIG. 4 is a flowchart illustrating an operation procedure of the additive manufacturing apparatus according to the first embodiment. FIG. 5 is a diagram for explaining formation of a deposited material performed by the additive manufacturing apparatus according to the first embodiment.

The additive manufacturing apparatus 100 manufactures a shaped object by stacking layers on top of another, each of the layers having a plurality of unit beads laid side by side in the layer. The unit bead is a solidified product formed by one machining operation. The machining operation is an operation of starting the addition of the molten material 21, continuing the welding of the molten material 21 into the molten pool 23, and then stopping the addition of the molten material 21. Each time the machining operation ends, the additive manufacturing apparatus 100 moves the processing head 10 to a position at which a next machining operation is to be started. In the first embodiment, the additive manufacturing apparatus 100 linearly forms the unit beads by adding the molten material 21 while moving the processing head 10 in a linear direction.

In step S1, the additive manufacturing apparatus 100 forms a unit bead 51*a* on the base material 17 that is the workpiece. In step S2, the additive manufacturing apparatus 100 irradiates an edge 52 of the unit bead 51*a* formed, with the laser beam 24. The edge 52 is one of two edges of the unit bead 51*a* along a longitudinal direction of the unit bead 51*a*, which is situated on a side where a next unit bead is formed. The additive manufacturing apparatus 100 irradiates the entirety of the edge 52 with the laser beam 24 by scanning the edge 52 with the laser beam 24. The additive manufacturing apparatus 100 flattens the unit bead 51*a* by irradiating the edge 52 with the laser beam 24. In the following description, a process for flattening the unit bead formed may be referred to as a flattening process in some cases. In the first embodiment, the flattening process forms a flat portion 53 on the side of the edge 52 of the unit bead 51*a*.

Figure 6:
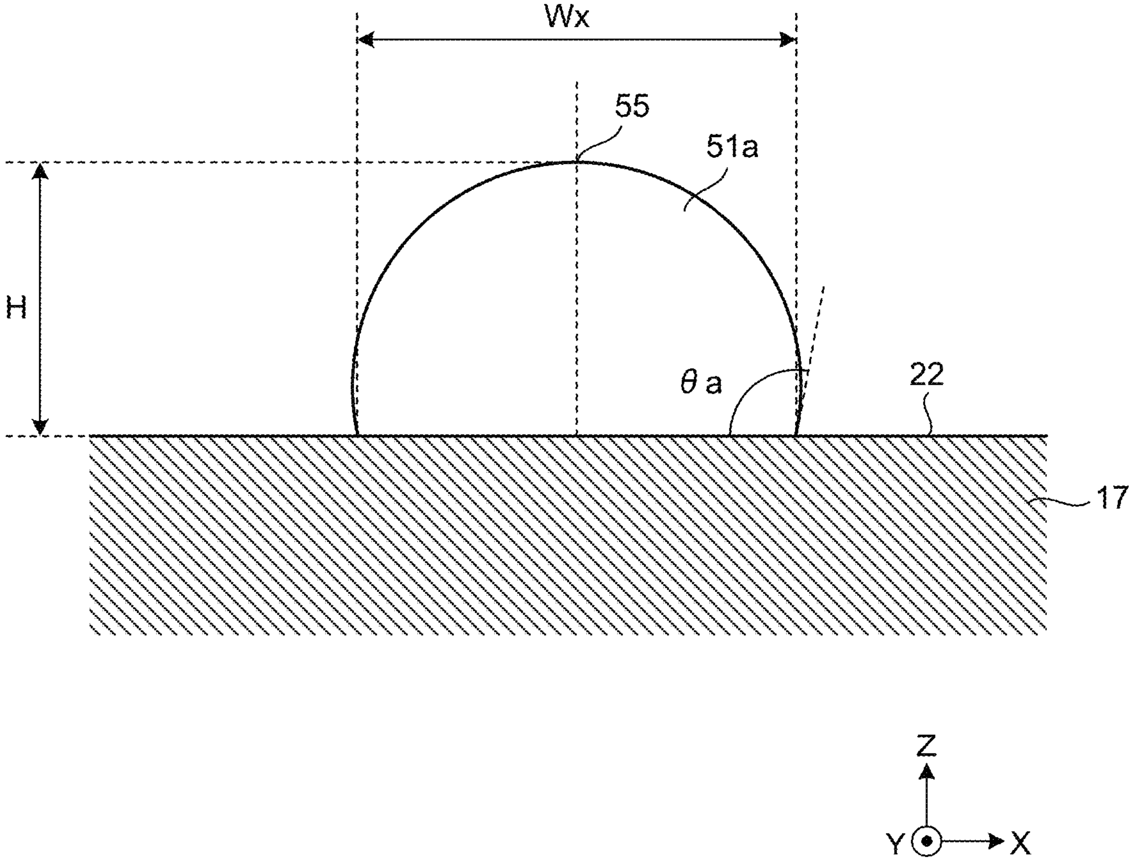
FIG. 6 is a schematic diagram illustrating a unit bead formed by the additive manufacturing apparatus according to the first embodiment.

FIG. 6 is a schematic diagram illustrating the unit bead formed by the additive manufacturing apparatus according to the first embodiment. FIG. 6 illustrates one end surface of the unit bead 51*a* in the longitudinal direction. The unit bead 51*a* is a three-dimensional object having a width of "Wx" in the X-axis direction and a height of "H" in the Z-axis direction. The height "H" is a height between the surface 22 of the workpiece and a top 55. In the following description, a ratio "Wx/H" between the width "Wx" in the X-axis direction and the height "H" may be referred to as flatness. The top 55 is the highest point of the unit bead 51*a* from the surface 22 in the vertical direction.

The edge 52 is a point of contact among three parts, i.e. the unit bead 51*a*, the surface 22 of the workpiece, and gas surrounding the unit bead 51*a*. A contact angle θa is an angle that is formed by the surface 22 and a surface of the unit bead 51*a* and contains the unit bead 51*a*. The contact angle θa becomes smaller after the flattening process than before the flattening process. The additive manufacturing apparatus 100 moves the irradiation position of the laser beam 24 in the X-axis direction from the irradiation position at which the laser beam 24 has been pointed when the unit bead 51*a* is formed, thereby to emit the laser beam 24 with causing the central axis of the laser beam 24 to coincide with the edge 52.

In the flattening process, the central axis of the laser beam 24 may deviate from the edge 52. The deviation between the edge 52 and the central axis of the laser beam 24 is, for example, within ±30% of a beam diameter according to a definition commonly referred to as D4σ.

In step S3, the additive manufacturing apparatus 100 forms a unit bead 51*b* in contact with the unit bead 51*a* that has been flattened, thereby forming a bead layer. The unit bead 51*b* is formed at a position in contact with the flat portion 53 of the unit bead 51*a*.

In step S4, the additive manufacturing apparatus 100 determines whether or not the formation of the bead layer has been completed. A shaped object is a layered product consisting of a plurality of bead layers. If the formation of the bead layer has not been completed (No in step S4), the additive manufacturing apparatus 100 proceeds to step S5 in the procedure. If the formation of the bead layer has been completed (Yes in step S4), the additive manufacturing apparatus 100 proceeds to step S6 in the procedure.

The additive manufacturing apparatus 100 determines whether or not the formation of the bead layer including the unit beads 51*a* and 51*b* has been completed after forming the unit bead 51*b* in step S3. If the formation of the bead layer has not been completed at the time the unit bead 51*b* is formed, the additive manufacturing apparatus 100 irradiates the edge 52 of the unit bead 51*b* formed, with the laser beam 24 in step S5. The additive manufacturing apparatus 100 forms the flat portion 53 at the edge 52 of the unit bead 51*b* by performing the flattening process on the unit bead 51*b*.

After the flattening process of the unit bead 51*b*, the additive manufacturing apparatus 100 returns to step S3 in the procedure. In step S3, the additive manufacturing apparatus 100 forms a unit bead 51*c* in contact with the unit bead 51*b* that has been flattened. The additive manufacturing apparatus 100 repeats the procedure from step S3 to step S5 until the formation of one bead layer is completed.

If the formation of a bead layer 54 has been completed by forming the unit bead 51*c*, the additive manufacturing apparatus 100 proceeds to step S6 in the procedure. In step S6, the additive manufacturing apparatus 100 forms a bead layer on the bead layer 54 that has been formed. The additive manufacturing apparatus 100 forms a bead layer on the bead layer 54 in a procedure similar to steps S1 to S5.

If the formation of the bead layer has been completed, the additive manufacturing apparatus 100 determines in step S7 whether or not the formation of the shaped object has been completed. If the formation of the shaped object has not been completed (No in step S7), the additive manufacturing apparatus 100 returns to step S6 in the procedure and further forms a bead layer. The additive manufacturing apparatus 100 forms the bead layers of the shaped object by repeating the procedure of step S6 and step S7. If the formation of the shaped object has been completed (Yes in step S7), the additive manufacturing apparatus 100 ends the operation according to the procedure illustrated in FIG. 4.

Figure 7:
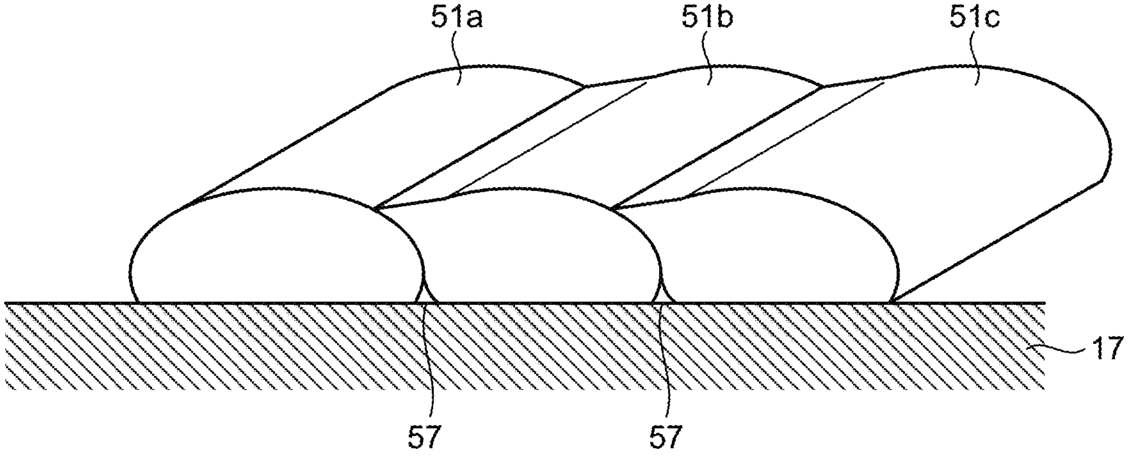
FIG. 7 is a diagram for explaining a comparative example for the first embodiment.

FIG. 7 is a diagram for explaining a comparative example for the first embodiment. The comparative example illustrates the unit beads 51*a*, 51*b*, and 51*c* in a case where the unit beads 51*a*, 51*b*, and 51*c* are formed without performing the flattening process. When the unit bead 51*b* is formed with the contact angle θa of the unit bead 51*a* being large, a gap 57 remains between the base material 17 and the unit beads 51*a* and 51*b* adjacent to each other. The gap 57 also remains between the base material 17 and the unit beads 51*b* and 51*c* adjacent to each other.

In the first embodiment, in the formation of unit beads brought into contact with each other to form a bead layer, the controller device 1 carries out controls such that a formed unit bead is flattened by irradiation to it with the laser beam 24, and a unit bead is formed in contact with the unit bead that has been flattened. The controller device 1 makes the unit bead flattened by irradiating the edge 52 of the formed unit bead with the laser beam 24.

The additive manufacturing apparatus 100 reduces the contact angle θa of the formed unit bead by the flattening process, and thereafter forms another unit bead in contact with the previous unit bead. The additive manufacturing apparatus 100 can prevent a gap from remaining because it can make the molten material 21 easily flowing between the unit beads adjacent to each other and the workpiece. As a result, the additive manufacturing apparatus 100 can prevent or reduce a gap between the unit beads adjacent to each other in the same bead layer.

Note that the shaped object may be constructed to include a unit bead not subjected to the flattening process and a unit bead in contact with the unit bead. The additive manufacturing apparatus 100 may perform the flattening process on a unit bead for a portion of the shaped object where increased strength is desired, while omitting the flattening process for other portions.

The additive manufacturing apparatus 100 may perform the flattening process in a case where the contact angle θa is larger than or equal to a threshold, or in a case where the flatness of the unit bead is less than a threshold. A camera for observing the contact angle θa or the flatness may be installed above the processing head 10. For example, the additive manufacturing apparatus 100 may perform the flattening process in a case where the contact angle θa is larger than 45 degrees, or in a case where the flatness is less than five. As a result, the additive manufacturing apparatus 100 can shorten the processing time compared to a case where the flattening process is performed on all the unit beads, and can prevent or reduce a gap remaining in the shaped object.

Note that in a case where a flat unit bead is formed by welding of the molten material 21 instead of the flattening process according to the first embodiment, the flat unit bead can be effectively formed by power enhancement of the laser beam 24 or increase in the scanning speed. Forming the flat unit bead requires an improvement in weldability of the molten material 21 with respect to the surface 22. However, conditions for the weldability between the molten material 21 and the surface 22 to be improved are limited. That is, when the output of the laser beam 24 is increased in order to obtain the flat unit bead, the wire 5 is excessively melted to cause poor welding to the surface 22, and a satisfactorily flat unit bead cannot be obtained. Poor welding also occurs when the scanning speed is excessively increased, and a satisfactorily flat unit bead cannot be obtained.

The first embodiment can separately perform the unit bead formation and the flattening process, and thus can select optimum values for the flattening process as parameters such as the output, the scanning speed, and the beam diameter of the laser beam 24. In the first embodiment, the flattening process is performed only on the edge 52 of the unit bead, so that the controller device 1 can make control such that the formed unit bead is flattened by irradiation with the laser beam 24 having a lower intensity than that of the laser beam 24 at the time of forming the unit bead. Alternatively, the controller device 1 may be adapted to flatten the formed unit bead using the laser beam 24 having a higher scanning speed than that of the laser beam 24 at the time of forming the unit bead. As a result, the additive manufacturing apparatus 100 can prevent excessive heat inputted to the workpiece and the unit bead, thereby minimizing a thermal effect on the workpiece and the unit bead. The additive manufacturing apparatus 100 can thus perform shaping with high quality.

Here, the satisfactory flattening process yields a state where the contact angle θa is 45 degrees or smaller or the flatness is five or higher after the flattening process. An ideal flatness is seven according to experiments by the inventors. The additive manufacturing apparatus 100 may omit the flattening process if capable of forming the unit bead with the flatness of five or higher without performing the flattening process.

In a case where the deposited material 18 undergoes an increase in temperature due to continued shaping for a long time, the unit beads may be flattened by the heat of the deposited material 18. Therefore, the flattening process may be performed on one or more bead layers with a small increase in temperature of the deposited material 18, for example, three bead layers stacked on the base material 17, and the flattening process may be omitted for each bead layer formed on or over the three bead layers. Alternatively, for each bead layer formed on or over the three bead layers, the intensity of the laser beam 24 in the flattening process may be reduced. As a result, the additive manufacturing apparatus 100 can prevent excessive heat from being inputted to the deposited material 18. The additive manufacturing apparatus 100 can also shorten the processing time by virtue of omission of the flattening process. These advantages are yielded also in the following second and third embodiments.

According to the first embodiment, in the formation of a unit beads brought into contact with each other to form the bead layer, the additive manufacturing apparatus 100 flattens the formed unit bead by irradiation with the laser beam 24, and forms a unit bead in contact with the unit bead that has been flattened. The additive manufacturing apparatus 100 can prevent or reduce the gap remaining between the unit beads adjacent to each other in the same bead layer. In this way, the additive manufacturing apparatus 100 has an advantageous effect of being able to prevent a decrease in strength of the shaped object.

Second Embodiment

A second embodiment is described for another mode of additive processing performed by the additive manufacturing apparatus 100 illustrated in FIG. 1. The operation of the additive manufacturing apparatus 100 according to the second embodiment will now be described with reference to FIGS. 8 and 9.

Figure 8:
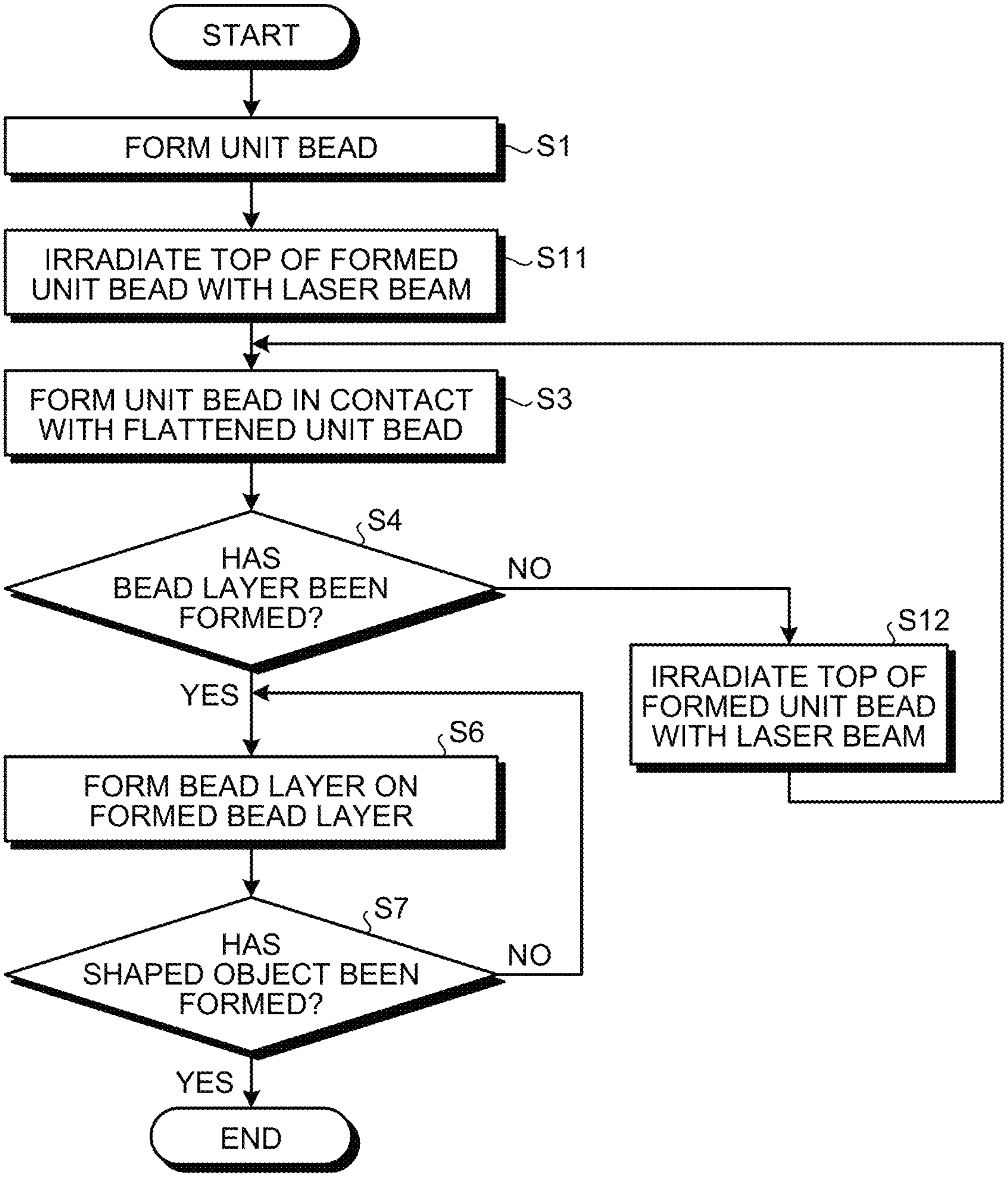
FIG. 8 is a flowchart illustrating an operation procedure of an additive manufacturing apparatus according to a second embodiment.
Figure 9:
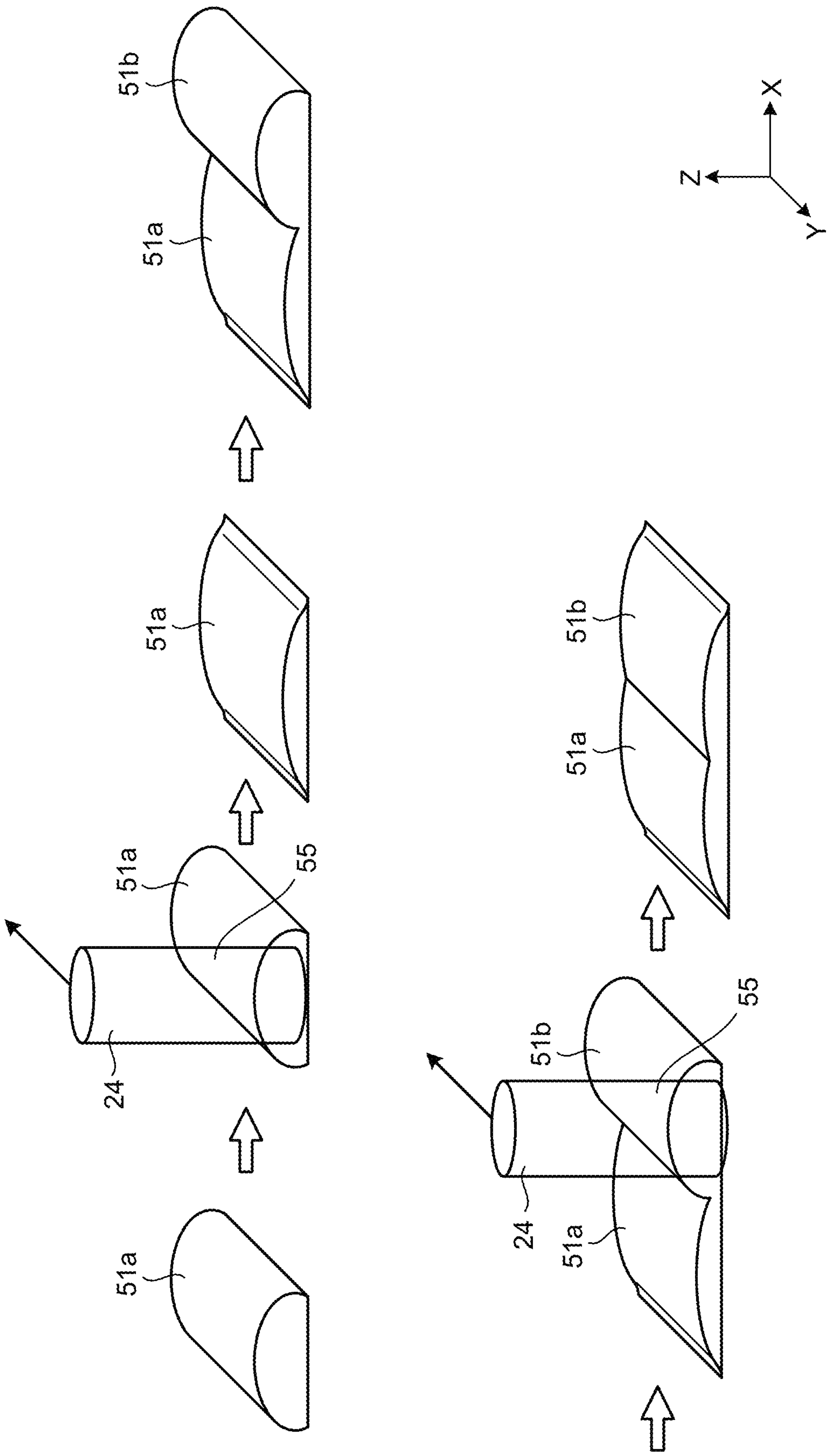
FIG. 9 is a diagram for explaining formation of a deposited material by the additive manufacturing apparatus according to the second embodiment.

FIG. 8 is a flowchart illustrating an operation procedure of the additive manufacturing apparatus according to the second embodiment. FIG. 9 is a diagram for explaining formation of a deposited material performed by the additive manufacturing apparatus according to the second embodiment. In the second embodiment, the additive manufacturing apparatus 100 performs the flattening process by irradiating a top of a unit bead with the laser beam 24. In the second embodiment, the same components as those in the above first embodiment are denoted by the same reference symbols as those in the first embodiment, and a configuration different from that of the first embodiment will be mainly described.

In step S1, the additive manufacturing apparatus 100 forms the unit bead 51*a* on the base material 17 that is the workpiece. In step S11, the additive manufacturing apparatus 100 irradiates the top 55 of the formed unit bead 51*a* with the laser beam 24. The additive manufacturing apparatus 100 irradiates the entirety of the top 55 with the laser beam 24 by scanning the top 55 with the laser beam 24. In the second embodiment, the flattening process flattens the entirety of the unit bead 51*a*. The additive manufacturing apparatus 100 reduces the contact angle θa of the unit bead 51*a* by flattening the entirety of the unit bead 51*a*. The additive manufacturing apparatus 100 performs the flattening process by irradiating the irradiation position of the laser beam 24, at which the unit bead 51*a* is formed, with the laser beam 24 again.

Steps S3 and S4 are similar to those in the case of the first embodiment illustrated in FIG. 4. In step S12, the additive manufacturing apparatus 100 irradiates the top 55 of the formed unit bead 51*b* with the laser beam 24. The additive manufacturing apparatus 100 flattens the entirety of the unit bead 51*b* by performing the flattening process on the unit bead 51*b*. The additive manufacturing apparatus 100 repeats the procedure of steps S3, S4, and S12 until the formation of one bead layer has been completed. After completing the formation of the bead layer, the additive manufacturing apparatus 100 proceeds to step S6 in the procedure.

After completing the formation of the bead layer, the additive manufacturing apparatus 100 forms each bead layer of a shaped object by steps S6 and S7 as in the case of the first embodiment illustrated in FIG. 4. If the formation of the shaped object has been completed (Yes in step S7), the additive manufacturing apparatus 100 ends the operation according to the procedure illustrated in FIG. 8.

In the second embodiment, in the formation of unit beads brought into contact with each other to form a bead layer, the controller device 1 performs control such that a formed unit bead is flattened by irradiation with the laser beam 24, and a unit bead in contact with the flattened unit bead is formed. The controller device 1 performs control such that the top 55 of the formed unit bead is irradiated with the laser beam 24 to thereby flatten the unit bead.

As with the first embodiment, the additive manufacturing apparatus 100 of the second embodiment can also reduce the contact angle θa of the formed unit bead by the flattening process and then form the unit bead in contact with the unit bead that has been flattened. In the case of the second embodiment, the additive manufacturing apparatus 100 flattens the entirety of the unit bead to be able to obtain a unit bead having a smooth surface with less unevenness. The additive manufacturing apparatus 100 can prevent or reduce a gap caused by the unevenness of the surface of the unit bead. As a result, the additive manufacturing apparatus 100 can prevent or reduce the gap remaining in the shaped object.

In the second embodiment, the additive manufacturing apparatus 100 may apply the laser beam 24 having a higher intensity than that when welding the molten material 21 in the flattening process. In this case, the controller device 1 performs control such that the formed unit bead is flattened by irradiation with the laser beam 24 having a higher intensity than that of the laser beam 24 used at the time of forming the unit bead. The additive manufacturing apparatus 100 applies the laser beam 24 having a higher intensity than that when welding the molten material 21, thereby making it possible to obtain the unit bead having high flatness. The additive manufacturing apparatus 100 can further prevent or reduce the gap by obtaining the unit bead having higher flatness.

In the second embodiment, the additive manufacturing apparatus 100 may apply the laser beam 24 having a larger diameter than that when welding the molten material 21. In this case, the controller device 1 performs control such that the formed unit bead is flattened by irradiation with the laser beam 24 having a larger diameter than that of the laser beam 24 used at the time of forming the unit bead. The additive manufacturing apparatus 100 can obtain the unit bead having high flatness by irradiation with the laser beam 24 over a wide range. The additive manufacturing apparatus 100 can further prevent or reduce the gap by obtaining the unit bead having higher flatness. The additive manufacturing apparatus 100 can change the diameter of the laser beam 24 by a zoom function implemented by driving a plurality of lenses provided inside the processing head 10.

Third Embodiment

A third embodiment is described for another mode of additive processing performed by the additive manufacturing apparatus 100 illustrated in FIG. 1. The operation of the additive manufacturing apparatus 100 according to the third embodiment will now be described with reference to FIGS. 10 to 14.

In the third embodiment, the additive manufacturing apparatus 100 forms a bead having a ball shape as a unit bead by providing the molten material 21 under a condition where the processing head 10 is stopped. In the following description, the bead having a ball shape may be referred to as a ball bead.

Figure 10:
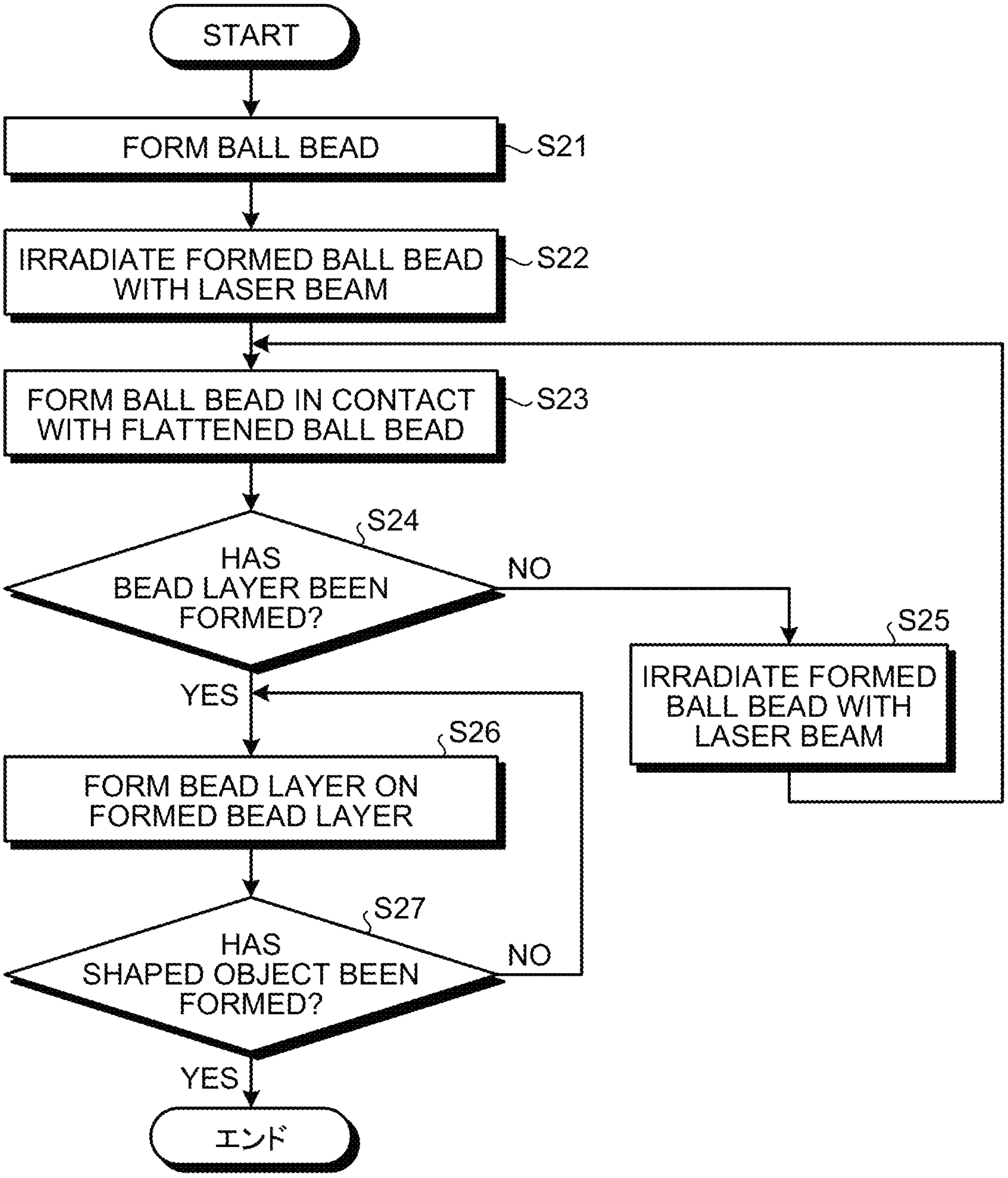
FIG. 10 is a flowchart illustrating an operation procedure of an additive manufacturing apparatus according to a third embodiment.
Figure 11:
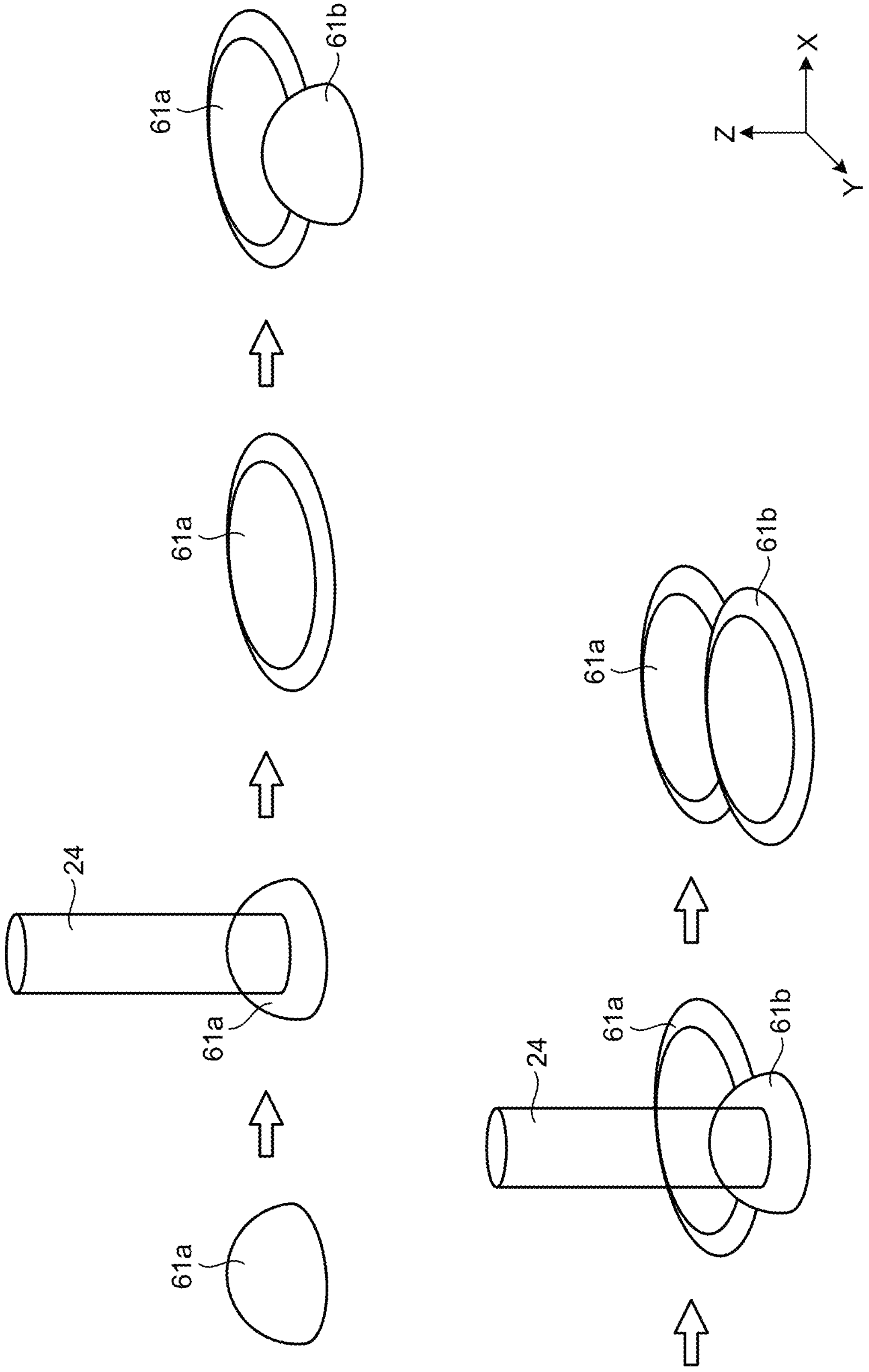
FIG. 11 is a diagram for explaining formation of a deposited material by the additive manufacturing apparatus according to the third embodiment.
Figure 12:
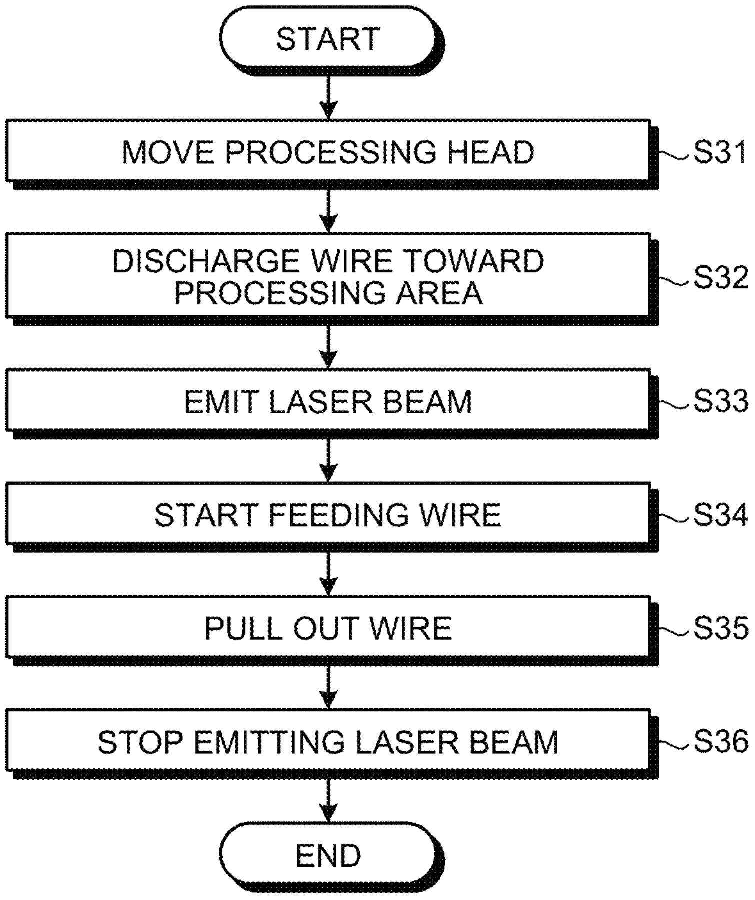
FIG. 12 is a flowchart for explaining a method of forming a ball bead by the additive manufacturing apparatus according to the third embodiment.
Figure 13:
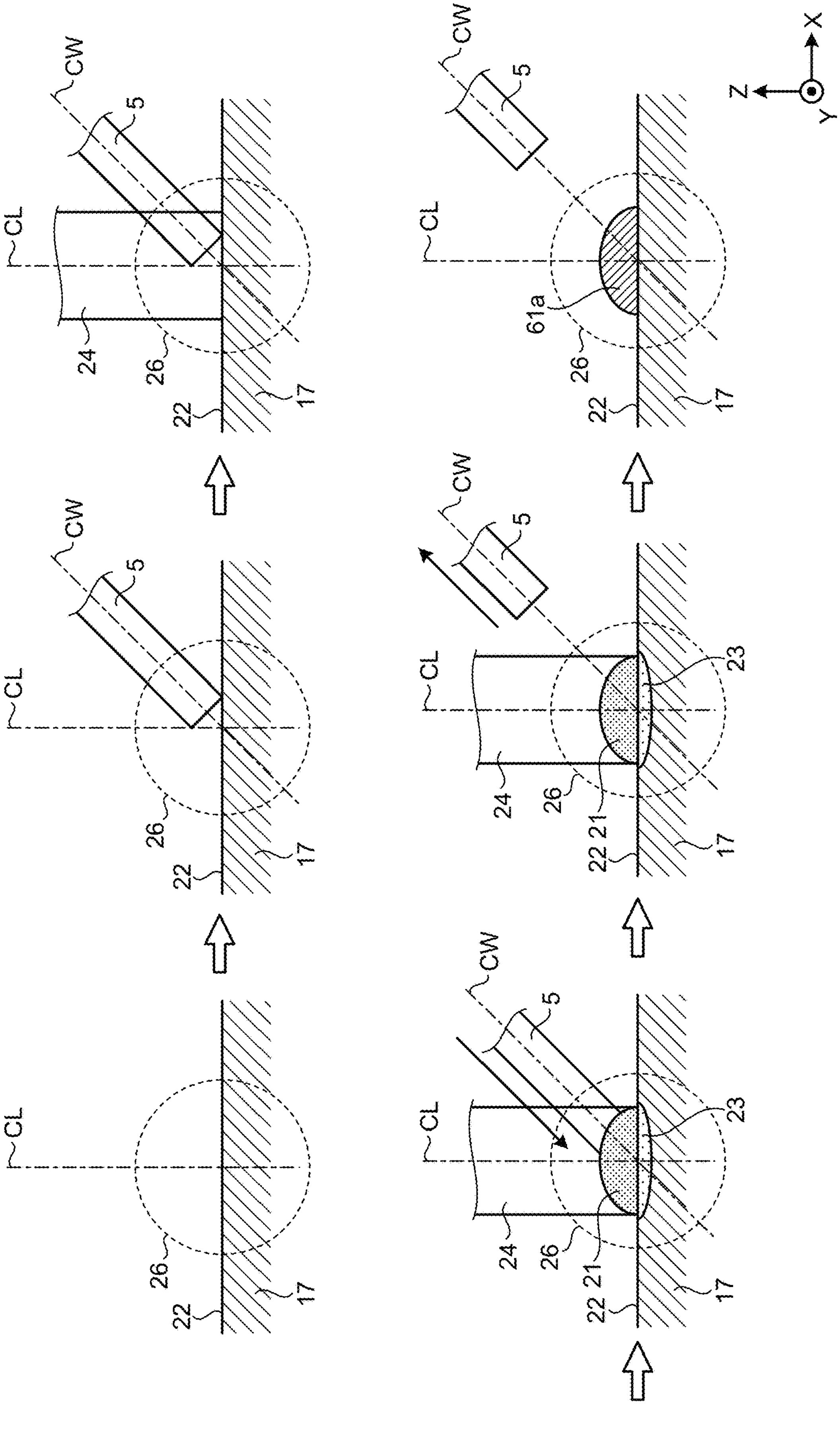
FIG. 13 is a diagram for explaining the formation of the ball bead by the additive manufacturing apparatus according to the third embodiment.
Figure 14:
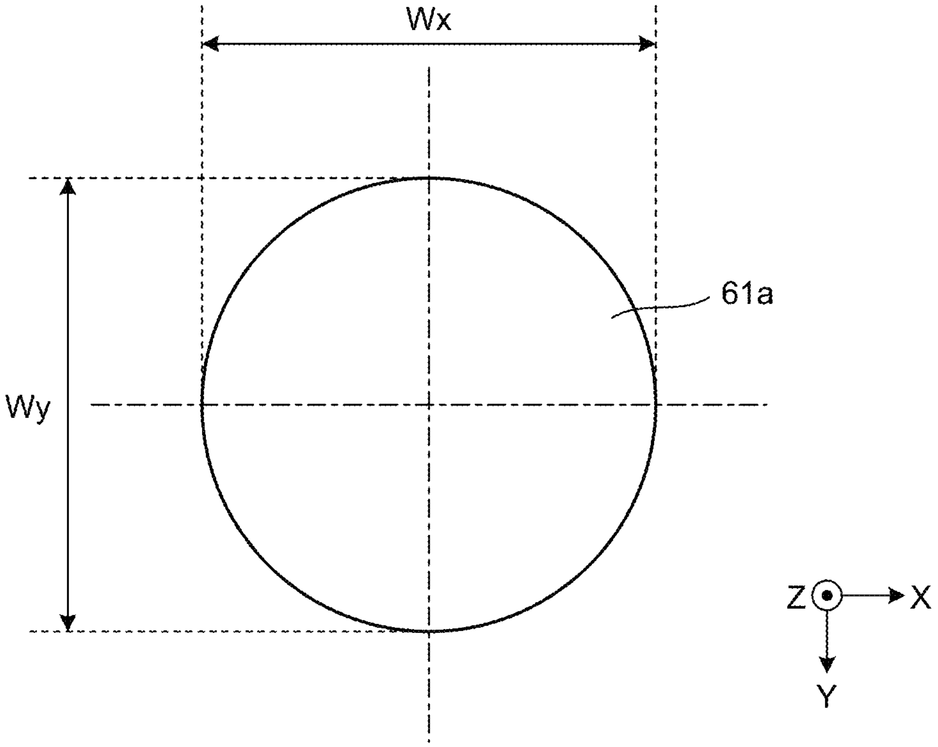
FIG. 14 is a schematic plan view of the ball bead formed by the additive manufacturing apparatus according to the third embodiment.

FIG. 10 is a flowchart illustrating an operation procedure of the additive manufacturing apparatus according to the third embodiment. FIG. 11 is a diagram for explaining formation of a deposited material performed by the additive manufacturing apparatus according to the third embodiment. FIG. 12 is a flowchart for explaining a method of forming a ball bead by the additive manufacturing apparatus according to the third embodiment. FIG. 13 is a diagram for explaining the formation of the ball bead performed by the additive manufacturing apparatus according to the third embodiment. FIG. 14 is a schematic plan view of the ball bead formed by the additive manufacturing apparatus according to the third embodiment. In the third embodiment, the additive manufacturing apparatus 100 performs flattening process on the ball bead. In the third embodiment, the same components as those in the above first or second embodiment are denoted by the same reference symbols as those in the first or second embodiment, and a difference in configuration from the first or second embodiment will be mainly described.

Here, formation of the ball bead will be described with reference to FIGS. 12 and 13. In step S31, the additive manufacturing apparatus 100 moves the processing head 10 to align the central axis CL of the laser beam 24 with the center of the processing area 26. In step S32, the additive manufacturing apparatus 100 obliquely discharges the wire 5 toward the processing area 26 to bring a tip of the wire 5 into contact with the surface 22. Discharging the wire 5 means causing the wire 5 to travel from the wire nozzle 12 toward the irradiation position of the laser beam 24 on the surface 22.

When the wire 5 is discharged from the wire nozzle 12 and brought into contact with the surface 22, the central axis CW of the wire 5 and the central axis CL of the laser beam 24 intersect on the surface 22. Alternatively, the central axis CW of the wire 5 intersects with the surface 22 within a range of the diameter of the laser beam 24. As a result, the additive manufacturing apparatus 100 can form, on the surface 22, a ball bead 61*a* centered on the point of intersection of the central axis CW of the wire 5 and the central axis CL of the laser beam 24.

In step S33, the additive manufacturing apparatus 100 applies the laser beam 24 toward the processing area 26. The laser beam 24 is applied to the wire 5 situated in the processing area 26. In synchronization with application or emission of the laser beam 24, ejection of the inert gas 25 from the gas nozzle 13 to the processing area 26 is started. Before the laser beam 24 is applied to the processing area 26, the inert gas 25 is preferably ejected from the gas nozzle 13 for a predetermined fixed period of time. This allows the additive manufacturing apparatus 100 to remove active gas such as oxygen remaining in the gas nozzle 13 from the gas nozzle 13.

In step S34, the additive manufacturing apparatus 100 starts feeding the wire 5 to the processing area 26 by discharging the wire 5 from the wire nozzle 12 toward the surface 22. The wire 5 is irradiated with the laser beam 24 so that the molten material 21 is generated and welded to the surface 22. As a result, the ball bead 61*a* is formed in the processing area 26. The additive manufacturing apparatus 100 continues to feed the wire 5 for a predetermined feed period of time after starting to feed the wire 5 to the processing area 26.

The additive manufacturing apparatus 100 adjusts a feed rate of the wire 5 by adjusting a rotational speed of the rotary motor 4. The feed rate of the wire 5 is limited by the output of the laser beam 24. That is, there is a correlation between the feed rate of the wire 5 and the output level of the laser beam 24 for achieving proper welding of the molten material 21 to the processing area 26. Increasing the output level of the laser beam 24 can shorten the time required for forming the ball bead 61*a*. Note that when the feed rate of the wire 5 is too high for the output level of the laser beam 24, the wire 5 remains unmelted. When the feed rate of the wire 5 is slow for the output of the laser beam 24, the wire 5 is excessively heated so that the molten material 21 drops from the wire 5 as a liquid droplet. In this case, the molten material 21 may be welded in a shape that is not a desired shape.

The ball bead 61*a* can be adjusted in size by changing the feed time of the wire 5 and the irradiation time of the laser beam 24. Increasing the feed time of the wire 5 and the irradiation time of the laser beam 24 can increase the diameter of the ball bead 61*a* to be formed. On the other hand, decreasing the feed time of the wire 5 and the irradiation time of the laser beam 24 can decrease the diameter of the ball bead 61*a* to be formed.

After forming the ball bead 61*a*, in step S35, the additive manufacturing apparatus 100 pulls out the wire 5 from the processing area 26. In step S36, the additive manufacturing apparatus 100 stops the irradiation with the laser beam 24 on the processing area 26. Here, the gas nozzle 13 continues the ejection of the inert gas 25 toward the workpiece. That is, after the laser oscillator 2 is stopped, the gas nozzle 13 continues the ejection of the inert gas 25 toward the processing area 26 over a predetermined duration of time.

The duration of time for which the inert gas 25 is ejected is a period of time required for lowering the temperature of the formed ball bead 61*a* to a predetermined temperature using the inert gas 25 after the irradiation with the laser beam 24 is stopped. The duration of time is determined on the basis of various conditions including a material quality or property of the wire 5, a size of the ball bead 61*a*, and the like. Information on the duration of time is stored in advance in the controller device 1. The additive manufacturing apparatus 100 stops the ejection of the inert gas 25 after the predetermined duration of time has elapsed since the stopping of the laser beam 24. This completes the formation of one ball bead 61*a*.

In step S21 illustrated in FIG. 10, the additive manufacturing apparatus 100 forms the ball bead 61*a* on the base material 17 that is the workpiece as described above. In the ball bead 61*a* illustrated in FIG. 14, the width "Wx" in the X-axis direction and a width "Wy" in the Y-axis direction are equal to each other. Otherwise, the width "Wx" and the width "Wy" may be different from each other. A ratio "Wx/Wy" between the width "Wx" and the width "Wy" need only be in a range of 0.5 to 2.0.

In step S22, the additive manufacturing apparatus 100 irradiates the formed ball bead 61*a* with the laser beam 24. In the third embodiment, the flattening process flattens the entirety of the ball bead 61*a*. The additive manufacturing apparatus 100 reduces the contact angle θa of the ball bead 61*a* by flattening the entirety of the ball bead 61*a*. The additive manufacturing apparatus 100 performs the flattening process by irradiating the irradiation position of the laser beam 24 set when the ball bead 61*a* is formed, with the laser beam 24 again.

In step S23, the additive manufacturing apparatus 100 forms a ball bead 61*b* in contact with the ball bead 61*a* that has been flattened. In step S24, the additive manufacturing apparatus 100 determines whether or not formation of a bead layer has been completed. If the formation of the bead layer has not been completed (No in step S24), the additive manufacturing apparatus 100 proceeds to step S25 in the procedure. If the formation of the bead layer has been completed (Yes in step S24), the additive manufacturing apparatus 100 proceeds to step S26 in the procedure.

The additive manufacturing apparatus 100 determines whether or not the formation of the bead layer including the ball beads 61*a* and 61*b* has been completed after forming the ball bead 61*b* in step S23. If the formation of the bead layer has not been completed at the time the ball bead 61*b* has been formed, the additive manufacturing apparatus 100 irradiates the formed ball bead 61*b* with the laser beam 24 in step S25. The additive manufacturing apparatus 100 repeats the procedure from step S23 to step S25 until the formation of one bead layer has been completed.

After completion of formation of the bead layer, the additive manufacturing apparatus 100 forms a bead layer on the bead layer that has been formed, in step S26. After completion of formation of the bead layer, the additive manufacturing apparatus 100 determines in step S27 whether or not the formation of a shaped object has been completed. If the formation of the shaped object has not been completed (No in step S27), the additive manufacturing apparatus 100 returns to step S26 in the procedure and further forms a bead layer. The additive manufacturing apparatus 100 forms bead layers of the shaped object by repeating the procedure of step S26 and step S27. If the formation of the shaped object has been completed (Yes in step S27), the additive manufacturing apparatus 100 ends the operation according to the procedure illustrated in FIG. 10.

In the third embodiment, in the formation of ball beads brought into contact with each other to form a bead layer, the controller device 1 performs control such that a formed ball bead is flattened by irradiation with the laser beam 24 and a next ball bead is formed in contact with the ball bead that has been flattened. In this way, the additive manufacturing apparatus 100 can reduce the contact angle θa of the formed ball bead by the flattening process, and then form the ball bead in contact with the previous ball bead that has been flattened.

In the third embodiment, the additive manufacturing apparatus 100 may apply the laser beam 24 having a higher intensity than that when welding the molten material 21 in the flattening process. In this case, the controller device 1 performs control such that the formed ball bead is flattened by irradiation with the laser beam 24 having a higher intensity than that of the laser beam 24 used at the time of forming the ball bead. The additive manufacturing apparatus 100 applies the laser beam 24 having the higher intensity than that when welding the molten material 21, thereby making it possible to obtain the unit bead having higher flatness. The additive manufacturing apparatus 100 can further prevent or reduce the gap by obtaining the unit bead having higher flatness.

In the third embodiment, the additive manufacturing apparatus 100 may apply the laser beam 24 having a larger diameter than that when welding the molten material 21. In this case, the controller device 1 performs control such that the formed ball bead is flattened by irradiation with the laser beam 24 having a larger diameter than that of the laser beam 24 used at the time of forming the ball bead. The additive manufacturing apparatus 100 can obtain the unit bead having high flatness by irradiation with the laser beam 24 over a wide range. The additive manufacturing apparatus 100 can further prevent or reduce the gap by obtaining the unit bead having higher flatness.

In the third embodiment, the additive manufacturing apparatus 100 may flatten the ball bead by irradiating an edge of the ball bead with the laser beam 24. Alternatively, the additive manufacturing apparatus 100 may flatten the ball bead by irradiation with the laser beam 24 having a lower intensity than that of the laser beam 24 used at the time of forming the ball bead. Yet alternatively, the additive manufacturing apparatus 100 may flatten the ball bead by irradiating a top of the ball bead with the laser beam 24. In any of the cases, the additive manufacturing apparatus 100 can reduce the contact angle θa of the formed ball bead by the flattening process, and then form a next ball bead in contact with the previous ball bead that has been flattened.

In the third embodiment, the additive manufacturing apparatus 100 manufactures the shaped object by stacking the bead layers each having ball beads laid side by side in the layer. The additive manufacturing apparatus 100 can improve the shaping accuracy by increased shaping resolution compared to a case where the unit bead is a linear bead. Increase in shaping resolution leads to increase in the number of interfaces between the unit beads in contact with each other. As the number of interfaces increases, the number of positions that can have gaps increases accordingly. According to the third embodiment, the additive manufacturing apparatus 100 can reduce the gaps remaining in the shaped object while enabling shaping with high accuracy.

Fourth Embodiment

Figure 15:
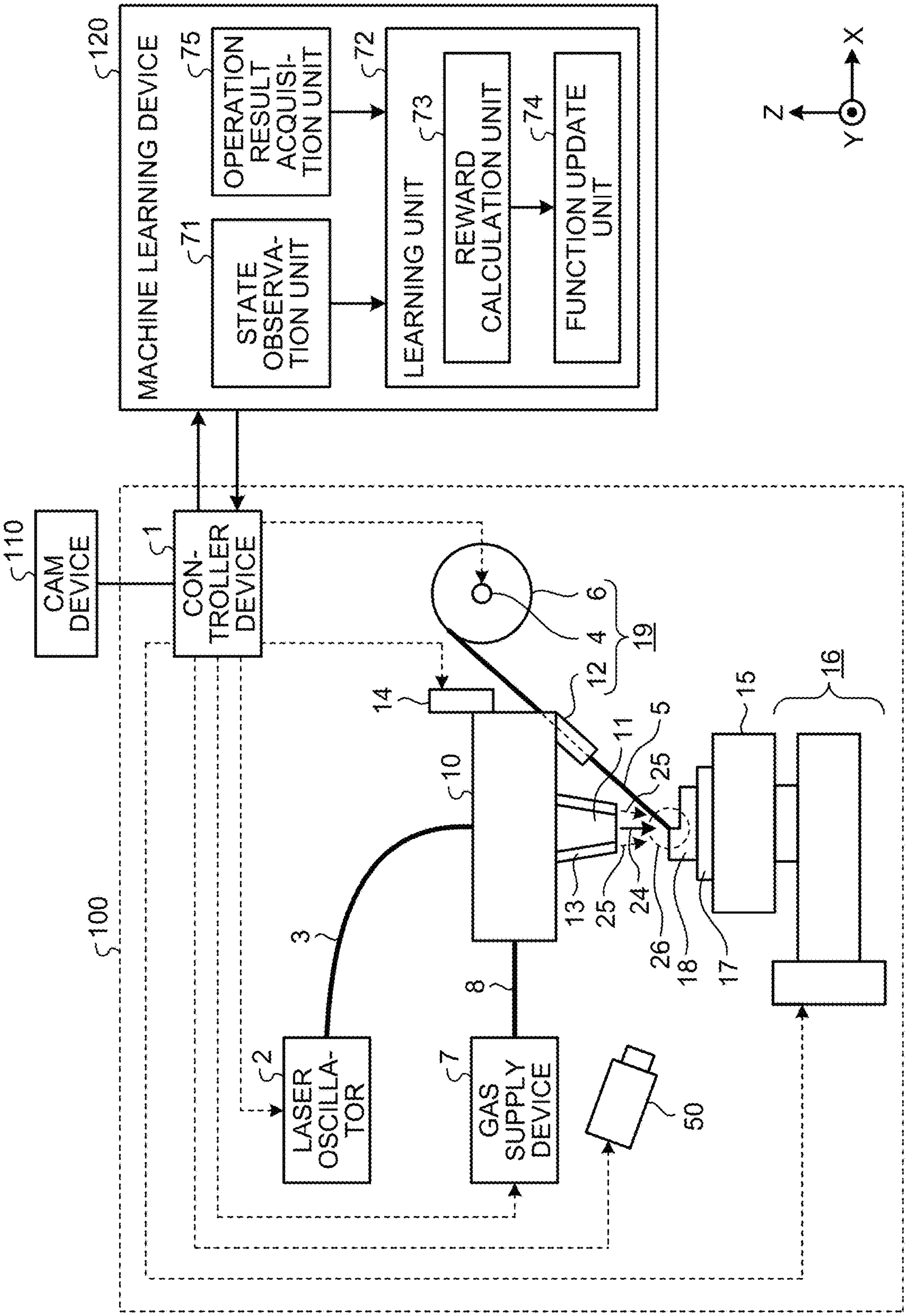
FIG. 15 is a diagram illustrating a configuration of an additive manufacturing system according to a fourth embodiment.

A fourth embodiment is described for a machine learning device that learns details of processing conditions for the flattening process. FIG. 15 is a diagram illustrating a configuration of an additive manufacturing system according to the fourth embodiment. An additive manufacturing system 200 according to the fourth embodiment includes the additive manufacturing apparatus 100, a computer aided manufacturing (CAM) device 110, and a machine learning device 120. The machine learning device 120 learns the details of the processing conditions for forming a unit bead with an ideal flatness in the flattening process. In the fourth embodiment, the same components as those in the above first to third embodiments are denoted by the same reference symbols as those in the first to third embodiments, and a difference in configuration from the first to third embodiments will be mainly described.

The CAM device 110 receives computer-aided design (CAD) data as its input. On the basis of the CAD data, the CAM device 110 generates a CAD model that is design data that specifies a target shape for additive manufacturing. The CAM device 110 generates a machining path for performing machining for the target shape on the basis of the CAD model, and produces a machining program from data of the machining path. The controller device 1 controls the additive manufacturing apparatus 100 according to the machining program produced by the CAM device 110.

The machine learning device 120 includes a state observation unit 71, a learning unit 72, and an operation result acquisition unit 75. The state observation unit 71 observes state information including a command value generated at the time of additive manufacturing and a state quantity for a processing state. The state observation unit 71 observes, as state variables, various kinds of command values generated by the controller device 1 and the state quantity for the processing state. The various kinds of command values include a command value that is a position command outputted to the head drive device 14, a command value that is an output command outputted to the laser oscillator 2, and a command value that is a supply command outputted to the rotary motor 4. The state quantity includes a temperature of the deposited material 18.

The operation result acquisition unit 75 acquires shape information indicating a shape of a unit bead as an operation result. The shape information includes data pieces of the widths “Wx” and “Wy” and the height “H” of the unit bead. The shape information is acquired by measurement means such as a camera or a height sensor 50 installed above the processing head 10.

The learning unit 72 creates a data set in which the state information inputted from the state observation unit 71 and the shape information inputted from the operation result acquisition unit 75 are put together. The learning unit 72 learns a relationship between the processing condition and the flatness in accordance with the data set produced on the basis of the state information and the shape information. The processing conditions include conditions for a material used in shaping, a material of the base material 17, laser output, the irradiation time, a cooling time, the machining path, and the like.

The learning unit 72 may use any learning algorithm. As an example, a case where reinforcement learning is applied will be described. In reinforcement learning, an action subject that is an agent in a certain environment observes a current state and determines an action to take. The agent receives a reward from the environment by choosing an action and learns a policy such that the reward can be obtained maximally through a series of actions. As representative methods for reinforcement learning, there have been known Q-learning, TD-learning, and the like. For example, in the case of Q-learning, an action-value table that is a typical update expression of an action-value function Q(s,a) is expressed by the following expression (1). The action-value function Q(s,a) represents an action value "Q" that is a value of an action where an action "a" is chosen under an environment "s".

[Formula 1]

$$Q(s_t,a_t)\rightarrow Q(s_t,a_t)+\alpha(r_{t+1}+\gamma\max_a Q(s_{t+1},a_t)-Q(s_t,a_t)) \quad (1)$$

The update expression represented by expression (1) above increases the action value "Q" if the action value of the action "a" that is the best at a time "t+1" is higher than the action value "Q" of the action "a" taken at a time "t", and otherwise decreases the action value "Q" if not. In other words, the action-value function Q(s,a) is updated so that the action value "Q" of the action "a" at the time "t" approaches the best action value at the time "t+1". As a result, the best action value in a certain environment is propagated in action values in previous environments sequentially.

The learning unit 72 includes a reward calculation unit 73 and a function update unit 74. The reward calculation unit 73 calculates a reward on the basis of the state information and the shape information. The function update unit 74 updates a function for determining a relationship among conditions that are the processing conditions in accordance with the reward calculated by the reward calculation unit 73.

The reward calculation unit 73 calculates a reward "r" on the basis of a difference between flatness of a unit bead and an ideal value representing ideal flatness. For example, in a case where a difference between the flatness of the unit bead and the ideal value becomes smaller than or equal to a threshold as a result of changing a certain condition among the processing conditions, the reward calculation unit 73 increases the reward "r". The reward calculation unit 73 increases the reward "r" by giving "1" that is a value of the reward. Note that the value of the reward used in this case is not necessarily limited to "1". Otherwise, in a case where a difference between the flatness of the unit bead and the ideal value becomes larger than a threshold as a result of changing a certain condition among the processing conditions, the reward calculation unit 73 decreases the reward "r". The reward calculation unit 73 decreases the reward "r" by giving "−1" that is a value of the reward. Note that the value of the reward used in this case is not necessarily limited to "−1".

Figure 16:
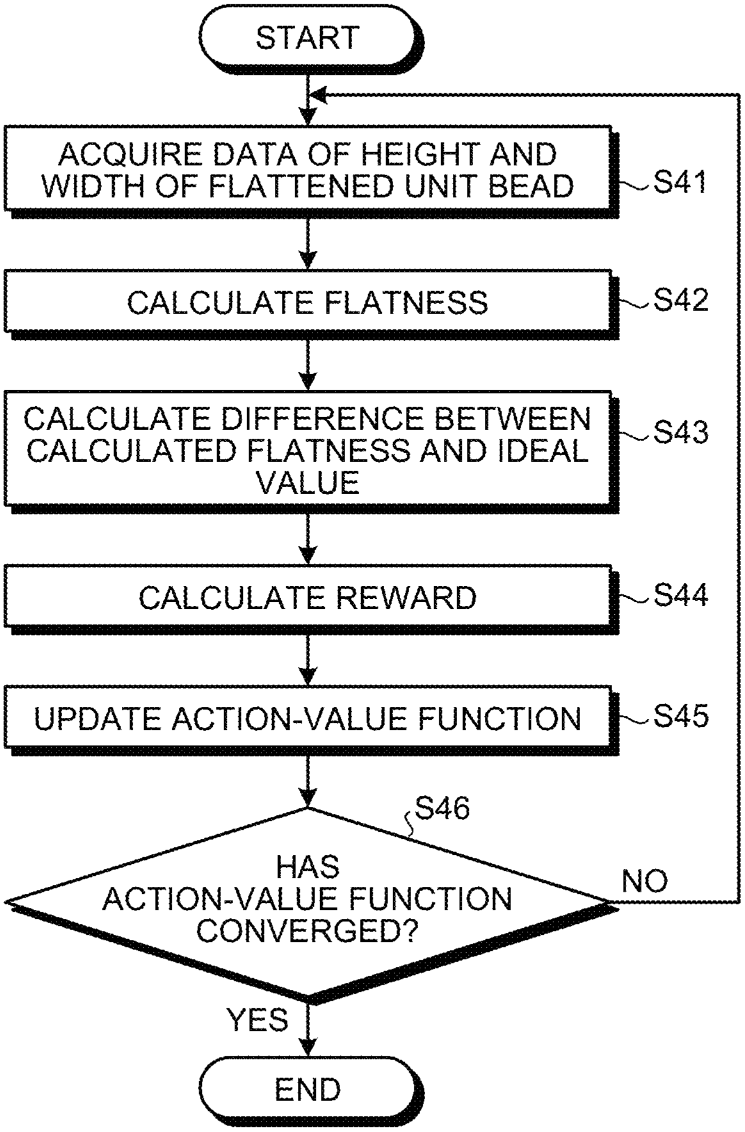
FIG. 16 is a flowchart illustrating an operation procedure of a machine learning device according to the fourth embodiment.

FIG. 16 is a flowchart illustrating an operation procedure of the machine learning device according to the fourth embodiment. A reinforcement learning method of updating the action-value function Q(s,a) will be described with reference to the flowchart of FIG. 16.

In step S41, the machine learning device 120 acquires data pieces of the height and the width of a unit bead that has been flattened. In step S42, the machine learning device 120 calculates flatness of the unit bead on the basis of the data pieces of the height and the width of the unit bead. In step S43, the machine learning device 120 calculates a difference between the calculated flatness and an ideal value. The ideal value is seven, for example.

In step S44, the machine learning device 120 calculates a reward on the basis of the difference. In step S45, the machine learning device 120 updates the action-value function Q(s,a) on the basis of the reward. In step S46, the machine learning device 120 determines whether or not the action-value function Q(s,a) has converged. The machine learning device 120 determines that the action-value function Q(s,a) has converged when the action-value function Q(s,a) is no longer updated in step S45.

If determining that the action-value function Q(s,a) has not converged (No in step S46), the machine learning device 120 returns to step S41 in the operation procedure. If determining that the action-value function Q(s,a) has converged (Yes in step S46), the machine learning device 120 ends the learning of the learning unit 72. The machine learning device 120 thus ends the operation according to the procedure illustrated in FIG. 16. Note that the machine learning device 120 may continue learning by returning from step S45 to step S41 in the operation procedure without making the determination of step S46.

The machine learning device 120 stores the generated action-value function Q(s,a) as a learned model. On the basis of the learned model, the controller device 1 infers a processing condition for forming a unit bead with flatness to be ideal and adjusts the processing condition on the basis of a result of inference.

The fourth embodiment has been described for the case where reinforcement learning is applied to the learning algorithm used by the learning unit 72, but learning other than the reinforcement learning may be applied to the learning algorithm. The learning unit 72 may execute machine learning using a publicly known learning algorithm other than the reinforcement learning, such as deep learning, neural network, genetic programming, functional logic programming, or support vector machine, for example.

The machine learning device 120 is not necessarily limited to a device included in the additive manufacturing system 200, and may be a device outside the additive manufacturing system 200. The machine learning device 120 may be a device connectable to the additive manufacturing system 200 via a network. The machine learning device 120 may be a device present on a cloud server. The machine learning device 120 may be built in the controller device 1.

The learning unit 72 may learn the relationship among the processing conditions in accordance with data sets produced for a plurality of additive manufacturing apparatuses 100. The learning unit 72 may acquire the data sets from two or more additive manufacturing apparatuses 100 used in the same site, or may acquire the data sets from two or more additive manufacturing apparatuses 100 used in their respective different sites. The data sets may be collected from a plurality of additive manufacturing apparatuses 100 operating independently of each other at their respective sites. After collection of the data sets from the additive manufacturing apparatuses 100 is started, a new additive manufacturing apparatus 100 may be added as a target from which a data set is collected. Otherwise, after collection of the data sets from the additive manufacturing apparatuses 100 is started, some of the additive manufacturing apparatuses 100 may be excluded from the targets from which the data sets are collected.

The learning unit 72 that has performed learning for one additive manufacturing apparatus 100 may perform learning for another additive manufacturing apparatus 100 other than the one additive manufacturing apparatus 100. The learning unit 72 that performs learning for the other additive manufacturing apparatus 100 can update an output prediction model by relearning for the other additive manufacturing apparatus 100. A function of the machine learning or a learned model as the learning result in the fourth embodiment may be used with being incorporated in a CAM software product for additive manufacturing.

According to the fourth embodiment, the machine learning device 120 outputs the learned model for forming the unit bead with the ideal flatness to the controller device 1. The additive manufacturing apparatus 100 can form the unit bead with the ideal flatness by adjusting the processing conditions on the basis of the learned model. Therefore, the additive manufacturing apparatus 100 can prevent or reduce the gap remaining in the shaped object.

The configuration illustrated in each of the above embodiments illustrates just an example of the content of the present disclosure. The configuration of each embodiment can be combined with other publicly known techniques. The configurations of the embodiments may be combined together as appropriate. A part of the configuration of each embodiment can be omitted or modified without departing from the scope of the present disclosure.

REFERENCE SIGNS LIST

1 controller device; 2 laser oscillator; 3 fiber cable; 4 rotary motor; 5 wire; 6 wire spool; 7 gas supply device; 8 pipe; 10 processing head; 11 beam nozzle; 12 wire nozzle; 13 gas nozzle; 14 head drive device; 15 stage; 16 rotation mechanism; 17 base material; 18 deposited material; 19 material supply unit; 21 molten material; 22 surface; 23 molten pool; 24 laser beam; 25 inert gas; 26 processing area; 41 CPU; 42 RAM; 43 ROM; 44 storage device; 45 input/output interface; 46 bus; 50 height sensor; 51*a*, 51*b*, 51*c* unit bead; 52 edge; 53 flat portion; 54 bead layer; 55 top; 57 gap; 61*a*, 61*b* ball bead; 71 state observation unit; 72 learning unit; 73 reward calculation unit; 74 function update unit; 75 operation result acquisition unit; 100 additive manufacturing apparatus; 110 CAM device; 120 machine learning device; 200 additive manufacturing system.

The invention claimed is:

1. An additive manufacturing apparatus that manufactures a shaped object by stacking layers in each of which unit beads that are solidified products of a molten material are laid side by side, the additive manufacturing apparatus comprising:

a material supply to supply the material to a workpiece;

a beam irradiator to emit a beam that melts the material supplied; and a controller device to control the material supply and the beam irradiator to form a unit bead, wherein in forming unit beads that are brought into contact with each other to form the layer, the controller device performs control such that the formed unit bead is flattened by irradiation with the beam, and a new unit bead is formed in contact with the formed unit bead that has been flattened, wherein the new unit bead is formed at a position in contact with a flattened portion of the formed unit bead that has been flattened, wherein the controller device performs control such that the formed unit bead is flattened when a contact angle of the formed unit bead is larger than 45 degrees or a flatness of the formed unit bead is less than five, and wherein the contact angle of the formed unit bead is an angle formed by a surface of the workpiece and a surface of the formed unit bead and containing the formed unit bead, and the flatness of the formed unit bead is a ratio between a width of the formed unit bead in a direction in which multiple said unit beads are laid side by side and a height of the formed unit bead from the surface of the workpiece.

2. The additive manufacturing apparatus according to claim 1, wherein the controller device performs control such that the formed unit bead is flattened by causing an edge of the formed unit bead to be irradiated with the beam.

3. The additive manufacturing apparatus according to claim 2, wherein the controller device performs control such that the formed unit bead is flattened by irradiation with a beam having a lower intensity than the beam used in forming the unit bead.

4. The additive manufacturing apparatus according to claim 2, wherein the controller device performs control such that the formed unit bead is flattened with a beam having a higher scanning speed than the beam used in forming the unit bead.

5. The additive manufacturing apparatus according to claim 1, wherein the controller device performs control such that the formed unit bead is flattened by causing a top of the formed unit bead to be irradiated with the beam.

6. The additive manufacturing apparatus according to claim 5, wherein the controller device performs control such that the formed unit bead is flattened by irradiation with a beam having a higher intensity than the beam used in forming the unit bead.

7. The additive manufacturing apparatus according to claim 5, wherein the controller device performs control such that the formed unit bead is flattened by irradiation with a beam having a larger diameter than the beam used in forming the unit bead.

8. The additive manufacturing apparatus according to claim 1, wherein the unit bead is a bead having a ball shape.

9. The additive manufacturing apparatus according to claim 1, wherein the controller device performs control such that the layer including a plurality of the unit beads that have been flattened is formed.

10. The additive manufacturing apparatus according to claim 1, wherein the material is a wire.

* * * * *